(12) United States Patent
Palmer

(10) Patent No.: US 9,172,918 B2
(45) Date of Patent: Oct. 27, 2015

(54) SYSTEMS AND METHODS FOR MANAGING LIVE VIDEO DATA

(75) Inventor: Sally-Anne Palmer, New South Wales (AU)

(73) Assignee: Honeywell International Inc., Morristown, NJ (US)

( * ) Notice: Subject to any disclaimer, the term of this patent is extended or adjusted under 35 U.S.C. 154(b) by 1478 days.

(21) Appl. No.: 12/525,431

(22) PCT Filed: Jan. 31, 2008

(86) PCT No.: PCT/AU2008/000107
§ 371 (c)(1),
(2), (4) Date: Jul. 31, 2009

(87) PCT Pub. No.: WO2008/092202
PCT Pub. Date: Aug. 7, 2008

(65) Prior Publication Data
US 2010/0026811 A1 Feb. 4, 2010

(30) Foreign Application Priority Data
Feb. 2, 2007 (AU) ............... 2007900502

(51) Int. Cl.
*H04N 7/18* (2006.01)
*G06F 11/30* (2006.01)
*G06F 11/00* (2006.01)
(Continued)

(52) U.S. Cl.
CPC ............ *H04N 7/181* (2013.01); *G06F 11/2033* (2013.01); *G08B 13/196* (2013.01); *G06F 11/2025* (2013.01); *G06F 11/2028* (2013.01); *G06F 11/3495* (2013.01)

(58) Field of Classification Search
CPC ........... G08B 13/19663; G06F 1/3209; H04N 21/44008
USPC ............................................ 348/159
See application file for complete search history.

(56) References Cited

U.S. PATENT DOCUMENTS 5,287,186 A * 2/1994 Takamori ............. 348/705
5,521,841 A 5/1996 Arman et al.
(Continued)

FOREIGN PATENT DOCUMENTS

EP 1259076 11/2002
EP 1403817 3/2004
(Continued)

OTHER PUBLICATIONS

Search Report for Corresponding European Application No. 08700403.2, dated Nov. 18, 2011.
(Continued)

*Primary Examiner* — Phuoc Nguyen
*Assistant Examiner* — Kishin G Belani
(74) *Attorney, Agent, or Firm* — Seager, Tufte & Wickhem, LLP

(57) ABSTRACT

Described herein are systems and methods for managing live video data. These include the likes of video management systems, camera servers, methods for providing access to video data, methods of operating camera servers, and software for allowing the implementation of such methods in a computer system. In overview, a video management system is configured such that, upon the failure of a camera server, cameras assigned to that server are automatically reassigned to a backup camera server.

7 Claims, 17 Drawing Sheets

(51) Int. Cl.
*H04N 5/268* (2006.01)
*G08B 13/196* (2006.01)
*G06F 11/20* (2006.01)
*G06F 11/34* (2006.01)

(56) References Cited

U.S. PATENT DOCUMENTS

| | | | |
|---|---|---|---|
| 5,583,796 A * | 12/1996 | Reese | 702/185 |
| 5,596,994 A | 1/1997 | Bro | |
| 5,634,008 A | 5/1997 | Gaffaney et al. | |
| 5,708,767 A | 1/1998 | Yeo et al. | |
| 5,751,336 A | 5/1998 | Aggarwal et al. | |
| 5,821,945 A | 10/1998 | Yeo et al. | |
| 5,828,809 A | 10/1998 | Chang et al. | |
| 5,969,755 A | 10/1999 | Courtney | |
| 5,974,235 A | 10/1999 | Nunally et al. | |
| 6,002,340 A * | 12/1999 | Smith | 340/3.4 |
| 6,018,359 A | 1/2000 | Kermode et al. | |
| 6,091,821 A | 7/2000 | Buer | |
| 6,181,867 B1 | 1/2001 | Kenner et al. | |
| 6,222,532 B1 | 4/2001 | Ceccarelli | |
| 6,359,647 B1 | 3/2002 | Sengupta et al. | |
| 6,400,890 B1 | 6/2002 | Nagasaka et al. | |
| 6,424,370 B1 | 7/2002 | Courtney | |
| 6,445,409 B1 | 9/2002 | Ito et al. | |
| 6,570,608 B1 | 5/2003 | Tserng | |
| 6,587,637 B2 | 7/2003 | Nagasaka et al. | |
| 6,628,835 B1 | 9/2003 | Brill et al. | |
| 6,643,387 B1 | 11/2003 | Sethuraman et al. | |
| 6,721,454 B1 | 4/2004 | Qian et al. | |
| 6,724,915 B1 | 4/2004 | Toklu et al. | |
| 6,744,968 B1 | 6/2004 | Imai et al. | |
| 6,754,389 B1 | 6/2004 | Dimitrova et al. | |
| 6,779,027 B1 | 8/2004 | Schunicht et al. | |
| 6,845,357 B2 | 1/2005 | Shetty et al. | |
| 6,879,709 B2 | 4/2005 | Tian et al. | |
| 6,940,474 B2 | 9/2005 | Weitbruch et al. | |
| 6,940,998 B2 | 9/2005 | Garoutte | |
| 6,948,082 B2 | 9/2005 | Gschwind et al. | |
| 6,970,640 B2 | 11/2005 | Green et al. | |
| 7,015,806 B2 * | 3/2006 | Naidoo et al. | 340/531 |
| 7,020,336 B2 | 3/2006 | Cohen-Solal et al. | |
| 7,046,731 B2 | 5/2006 | Wu et al. | |
| 7,068,842 B2 | 6/2006 | Liang et al. | |
| 7,076,102 B2 | 7/2006 | Lin et al. | |
| 7,106,885 B2 | 9/2006 | Osterweil et al. | |
| 7,110,569 B2 | 9/2006 | Brodsky et al. | |
| 7,159,234 B1 * | 1/2007 | Murphy et al. | 725/87 |
| 7,194,110 B2 | 3/2007 | Qian | |
| 7,200,266 B2 | 4/2007 | Ozer et al. | |
| 7,227,569 B2 | 6/2007 | Maruya | |
| 7,295,673 B2 | 11/2007 | Grab et al. | |
| 7,346,186 B2 | 3/2008 | Sharoni et al. | |
| 7,352,952 B2 | 4/2008 | Herberger et al. | |
| 7,469,343 B2 | 12/2008 | Ray et al. | |
| 7,469,363 B2 | 12/2008 | Meis et al. | |
| 7,570,867 B2 | 8/2009 | Barrett et al. | |
| 2001/0010541 A1 | 8/2001 | Fernandez et al. | |
| 2002/0107949 A1 | 8/2002 | Rawson, III | |
| 2003/0051026 A1 | 3/2003 | Carter et al. | |
| 2003/0053659 A1 | 3/2003 | Pavlidis et al. | |
| 2003/0067387 A1 | 4/2003 | Kwon et al. | |
| 2003/0123703 A1 | 7/2003 | Pavlidis et al. | |
| 2003/0126293 A1 | 7/2003 | Bushey | |
| 2003/0133614 A1 | 7/2003 | Robins et al. | |
| 2003/0156824 A1 | 8/2003 | Lu | |
| 2004/0062525 A1 | 4/2004 | Hasegawa et al. | |
| 2004/0080615 A1 | 4/2004 | Klein et al. | |
| 2004/0130620 A1 | 7/2004 | Buehler et al. | |
| 2004/0252193 A1 | 12/2004 | Higgins | |
| 2004/0263621 A1 | 12/2004 | Guo et al. | |
| 2005/0008198 A1 | 1/2005 | Guo et al. | |
| 2005/0085928 A1 * | 4/2005 | Shani | 700/18 |
| 2006/0045185 A1 | 3/2006 | Kiryati et al. | |
| 2006/0064731 A1 | 3/2006 | Kahle et al. | |
| 2006/0206748 A1 * | 9/2006 | Li | 714/4 |
| 2006/0215752 A1 | 9/2006 | Lee et al. | |
| 2006/0215753 A1 | 9/2006 | Lee et al. | |
| 2006/0238616 A1 | 10/2006 | Curtner et al. | |
| 2006/0239645 A1 | 10/2006 | Curtner et al. | |
| 2008/0087663 A1 | 4/2008 | Mansbery et al. | |

FOREIGN PATENT DOCUMENTS

| | | |
|---|---|---|
| JP | 2000276577 | 10/2000 |
| JP | 2005295255 | 10/2005 |
| WO | WO 01/63576 | 8/2001 |
| WO | 2007000637 | 1/2007 |

OTHER PUBLICATIONS

Huang et al., "Enabling Robust Network Fault Tolerance for IP-based Surveillance Systems," IEEE, pp. 39-43, 2007.
Lipton et al., "Critical Asset Protection, Perimeter Monitoring, and Threat Detection Using Automated Video Surveillance," Article on Objectvideo.com, 11 pages, printed Sep. 2004.
Lipton, "ObjectVideo Forensics: Activity-Based Video Indexing and Retrieval for Physical Security Applications," Article on Objectvideo.com, 11 pages, printed Sep. 2004.
Medioni et al., "Event Detection and Analysis from Video Streams," IEEE Transactions on Pattern Analysis and Machine Intelligence, vol. 23, No. 8, pp 873-889, Aug. 2001.
Mills et al., "A Magnifier Tool for Video Data," Proceedings of the Conference on Human Factors in Computing Systems, pp. 93-98, May 3, 1992.
Porikli et al., "Event Detection by Eigenvector Decomposition Using Object and Frame Features," IEEE, 10 pages, 2004.
Smoliar et al., "Content-Based Video Indexing and Retrieval," IEEE MultiMedia No. 2, pp. 62-72, 1994.

* cited by examiner

SYSTEMS AND METHODS FOR MANAGING LIVE VIDEO DATA

FIELD OF THE INVENTION

The present invention relates to systems and methods for managing live video data and, in various embodiments, to the likes of video management systems, camera servers, methods for providing access to video data, methods of operating camera servers, and software for allowing the performance of such methods.

Embodiments of the invention have been primarily developed to provide reliable end-user access to live video data in the context of a video surveillance system, and some embodiments will be described herein with particular reference to that application. However, it will be appreciated that the invention is not limited to such a field of use, and is applicable in broader contexts.

BACKGROUND

Any discussion of the prior art throughout the specification should in no way be considered as an admission that such prior art is widely known or forms part of common general knowledge in the field.

Surveillance systems typically include one or more cameras for capturing live video data. Each camera provides this live video data for allowing the surveillance, in real time, of a surveillance area defined by the view cone of that camera. In this context, the live video data is also commonly referred to as surveillance footage. Typically this surveillance footage is monitored in real-time by a human security officer via a user-interface running on a surveillance terminal. In some cases, it is additionally monitored by way of a software-based analytics program.

From an implementation perspective, it is common to make use of camera servers. A camera server is a component that has assigned to it one or more cameras, and that is configured to make the surveillance footage captured those cameras available for real-time viewing - for example at the surveillance terminal. In some cases the cameras stream the surveillance footage over a TCP/IP network, and the footage is buffered by camera servers connected to the network. The surveillance terminal is also connected to the network, and is able to access footage buffered at the camera servers. This allows the security officer, by way of the user-interface, to view the surveillance footage in real time.

A problem arises when a camera server fails. In particular, surveillance footage captured at cameras assigned to a failed camera server will not be available for monitoring by the security officer. Overcoming this problem typically requires either performing maintenance on the failed camera server to remedy the failure, or manually reassigning the cameras in question to a different camera server—which often requires the installation of a replacement server. The implementation of any of these solutions typically requires a level of technical expertise exceeding the average requirements for a security officer, and as such technical personnel must be engaged. During the time the problem persists, surveillance footage from the affected cameras is not able to be monitored, leading to potentially serious security concerns.

There is a need for improved systems and methods for managing live video data.

SUMMARY OF THE INVENTION

It is an object of the present invention to overcome or ameliorate at least one of the disadvantages of the prior art, or to provide a useful alternative.

One embodiment provides a video management system including:

a first camera for providing first live video data;

a first camera server initially configured to make the first video data available in real time to one or more clients;

a second camera server initially assigned as a backup for the first camera server; and a monitoring module for assessing input indicative of one or more operational characteristics of the first camera server and, in the case that one or more of the operational characteristics meet predefined criteria, configuring the second camera server to make the first video data available in real time to the one or more clients.

One embodiment provides a method for providing one or more clients with real time access to first live video data captured at a first camera, the method including the steps of:

(a) configuring a first camera server to make the first video data available in real time to the one or more clients;

(b) configuring a second camera server to be a backup for the first camera server;

(c) assessing input indicative of one or more operational characteristics of the first camera server and, in the case that one or more of the operational characteristics meet predefined criteria, configuring the second camera server to make the first video data available in real time to the one or more clients.

One embodiment provides a method for operating a secondary camera server, the method including the steps of:

(a) configuring the secondary camera server to be a backup for a selection of the primary camera servers the primary camera servers initially being configured to make available in real time to one or more clients live video data from one or more cameras;

(b) assessing input indicative of one or more operational characteristics of the selection of primary camera servers and, in the case that one or more of the operational characteristics meet predefined criteria for a given one of the camera servers, configuring the secondary camera server to make available in real time to the one or more clients the video data initially made available by that given one of the primary camera servers.

One embodiment provides a computer-readable carrier medium carrying a set of instructions that when executed by one or more processors cause the one or more processors to perform a method of operating a secondary camera server, the method including the steps of:

(a) configuring the secondary camera server to be a backup for one or more primary camera servers, the primary camera servers initially being configured to make available in real time to one or more clients live video data from one or more cameras;

(b) assessing input indicative of one or more operational characteristics of the selection of primary camera servers and, in the case that one or more of the operational characteristics meet predefined criteria for a given one of the camera servers, configuring the secondary camera server to make available in real time to the one or more clients the video data initially made available by that given one of the primary camera servers.

One embodiment provides a computer-readable carrier medium carrying a set of instructions that when executed by one or more processors cause the one or more processors to perform a method of operating a secondary camera server, the method including the steps of:

(a) assessing input indicative of one or more operational characteristics of one or more primary camera servers;

(b) determining whether for a given one of the camera servers, the operational characteristics meet predefined criteria;

(c) in the case that one or more of the operational characteristics meet predefined criteria for the given one of the camera servers, configuring a secondary camera server to make available in real time to the one or more clients the video data initially made available by that given one of the primary camera servers.

One embodiment provides a backup camera server including:

an interface for selectively obtaining live video data from one or more cameras;

a processing unit;

a memory module containing carrying a set of instructions that when executed by the processing unit cause the processing unit to assess input indicative of one or more operational characteristics of one or more primary camera servers and, in the case that one or more of the operational characteristics meet predefined criteria for a given one of the camera servers, configuring the backup camera server to make available in real time to the one or more clients the video data initially made available by that given one of the primary camera servers.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Preferred embodiments of the invention will now be described, by way of example only, with reference to the accompanying drawings in which.

DETAILED DESCRIPTION

Described herein are systems and methods for managing live video data. These include the likes of video management systems, camera servers, methods for providing access to video data, methods of operating camera servers, and software for allowing the implementation of such methods in a computer system. In overview, a video management system is configured such that, upon the failure of a camera server, cameras assigned to that server are automatically reassigned to a backup camera server.

Figure 1:
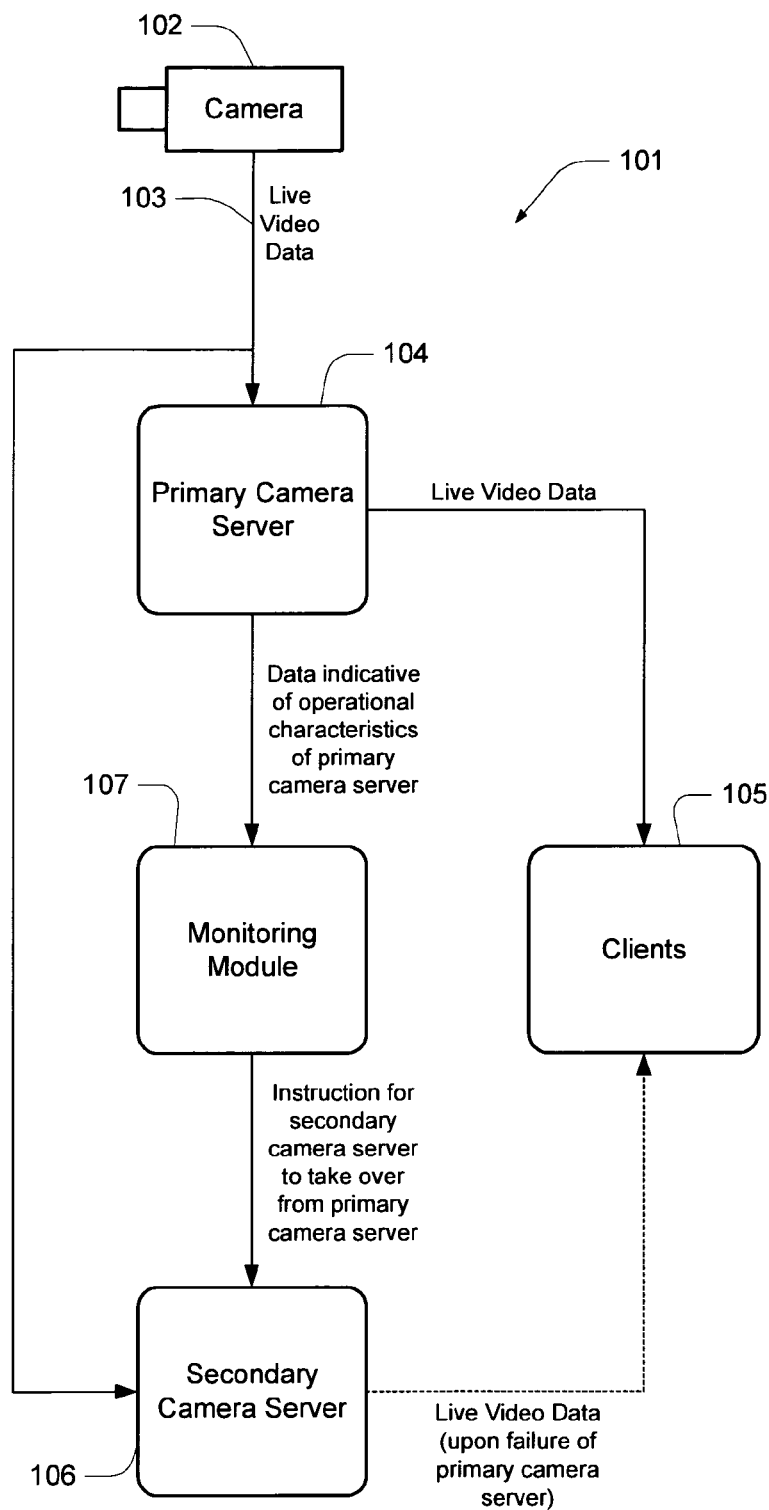
FIG. 1 is a schematic representation of a system for managing live video data according to one embodiment.

Referring initially to FIG. 1, a video management system 101 includes a first camera 102 for providing live video data 103. A first camera server 104 is initially configured to make video data 103 available in real time to one or more clients 105. A second camera server 106 is initially assigned as a backup for camera server 104. A monitoring module 107 assesses input indicative of one or more operational characteristics of camera server 104 and, in the case that one or more of the operational characteristics meet predefined criteria, configures camera server 106 to make video data 103 available, in real time, to clients 105.

In the context of the present disclosure, a camera server is a component that, in conceptual terms, includes an input for receiving/obtaining live video data from a source, and an output for providing/making that live video data available to one or more clients. For the embodiments described herein, the input and output are provided by a network interface. However, in some embodiments the input takes other forms, including analogue or digital video interfaces, peripheral connections, and telecommunications interfaces. Likewise, in some embodiments, the output takes the form of an alternate communications interface, including the likes of a peripheral interface or telecommunications interface.

The term "client" should be afforded a broad interpretation. Generally speaking, a client is a component (in terms of hardware and/or software) to which the live vide data is made available. In some embodiments the clients are defined by software applications executing on respective terminals.

The term "primary camera server" denotes a camera server that is, at least initially, configured to receive/obtain and provide/make available the live video data to the one or more clients. A "secondary camera server" or "backup camera server" is a camera server that is, at least initially, configured to act as a backup for one or more primary camera servers. The descriptors "secondary" and "backup" are used interchangeably insofar as they relate to camera servers. In some embodiments the distinction between primary and secondary camera servers resides substantively at a configuration level only, in that a given server component is able to take on a role as either a primary or secondary camera server.

In the present embodiment, the predetermined conditions are met in the case that camera server 104 fails to make video 103 data available to clients 105. To this end, the one or more operational characteristics include the following:

The status of the connection between camera server 104 and one or more other components. If there is a failure in communication, the predetermined conditions are met.

Such a failure in communication might be inferred from a range of aspects concerning the status of the connection. For example, in one embodiment there is a continual request/response communication between the camera server and another component, and failure in communication is inferred from a failure or deficiency in the request/response communication.

The operational status of camera sever 104. If camera server 104 is out of operation, the predetermined conditions are met. It might be inferred that the camera server is out of operation is it is uncontactable, or if it fails to provide one or more signals where expected.

The execution status of one or more services configured to run on the first camera server. If a service that is required for the provision of video data to clients is not executing on camera server 104, the predetermined conditions are met. In some cases services are periodically polled to determine their respective execution statuses.

Figure 1A:
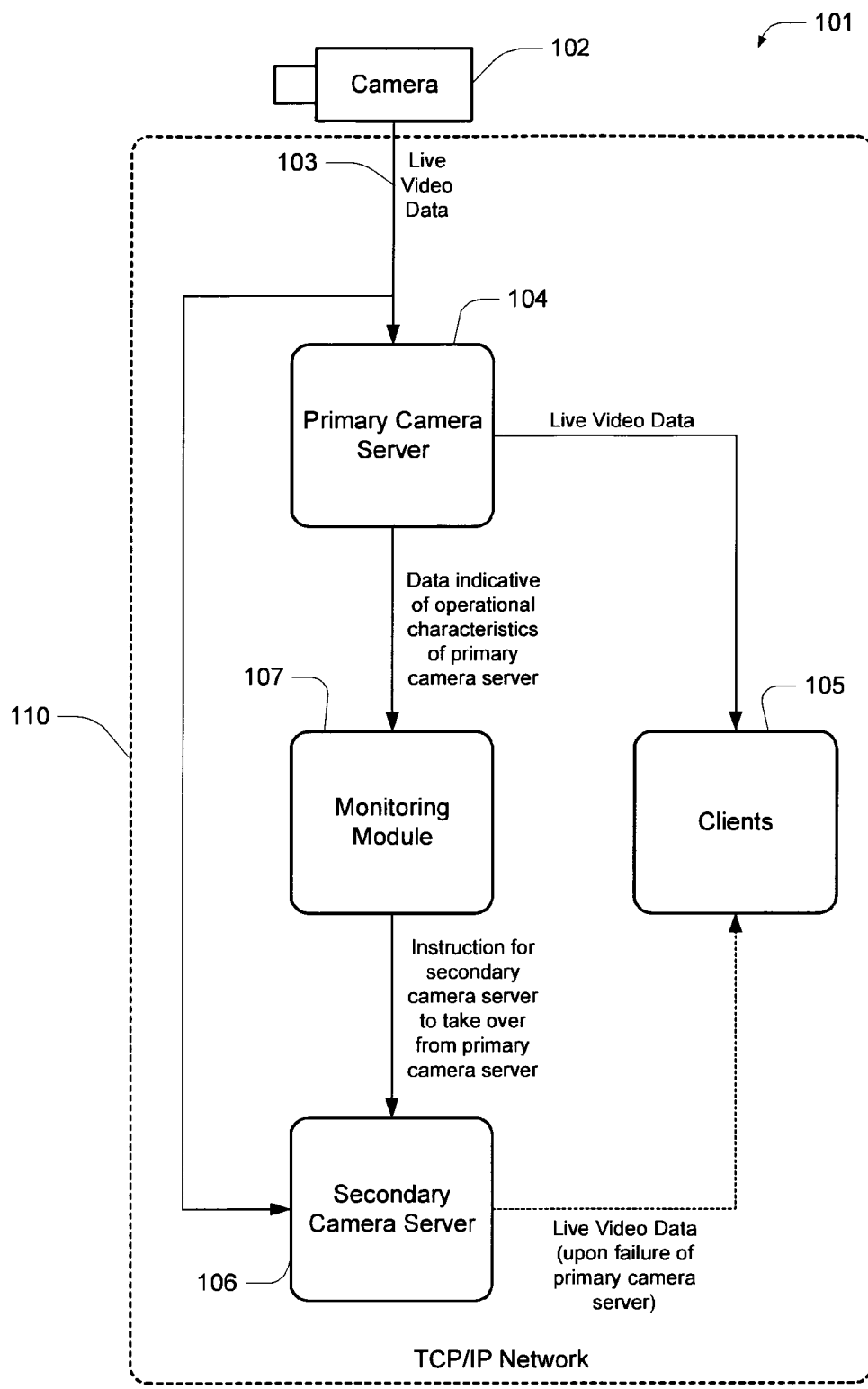
FIG. 1A is a schematic representation of a system for managing live video data according to one embodiment.

In some embodiments, such as the embodiment of FIG. 1A camera 102 streams video data 103 over a network 110 (such as a TCP/IP network or other type of network), and the predetermined conditions are met in the event that camera server 104 is unresponsive to module 107 over that network. It will be appreciated that the operational characteristics discussed above apply equally to networked and non-networked environments.

Figure 1B:
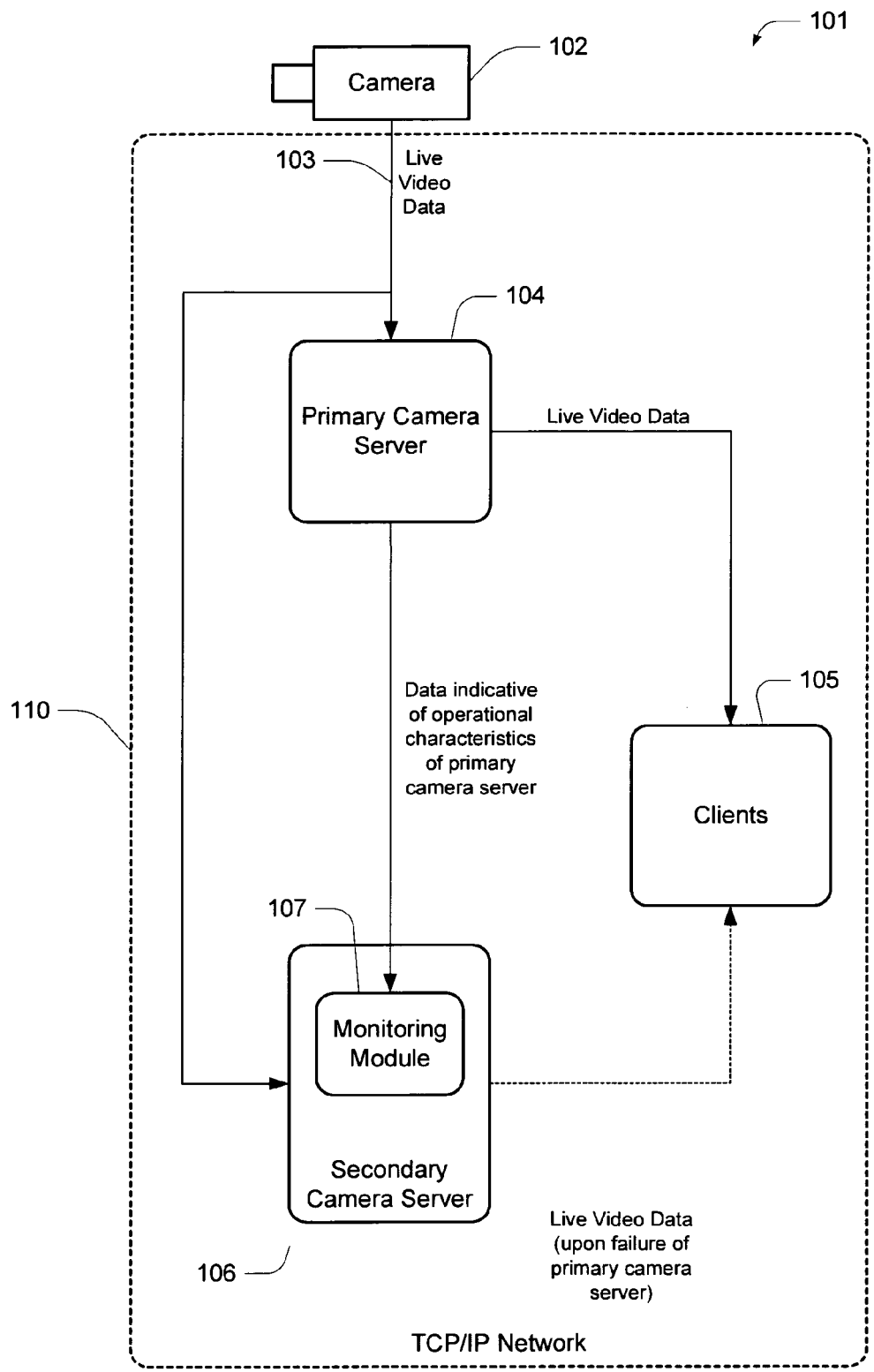
FIG. 1B is a schematic representation of a system for managing live video data according to one embodiment.
Figure 1C:
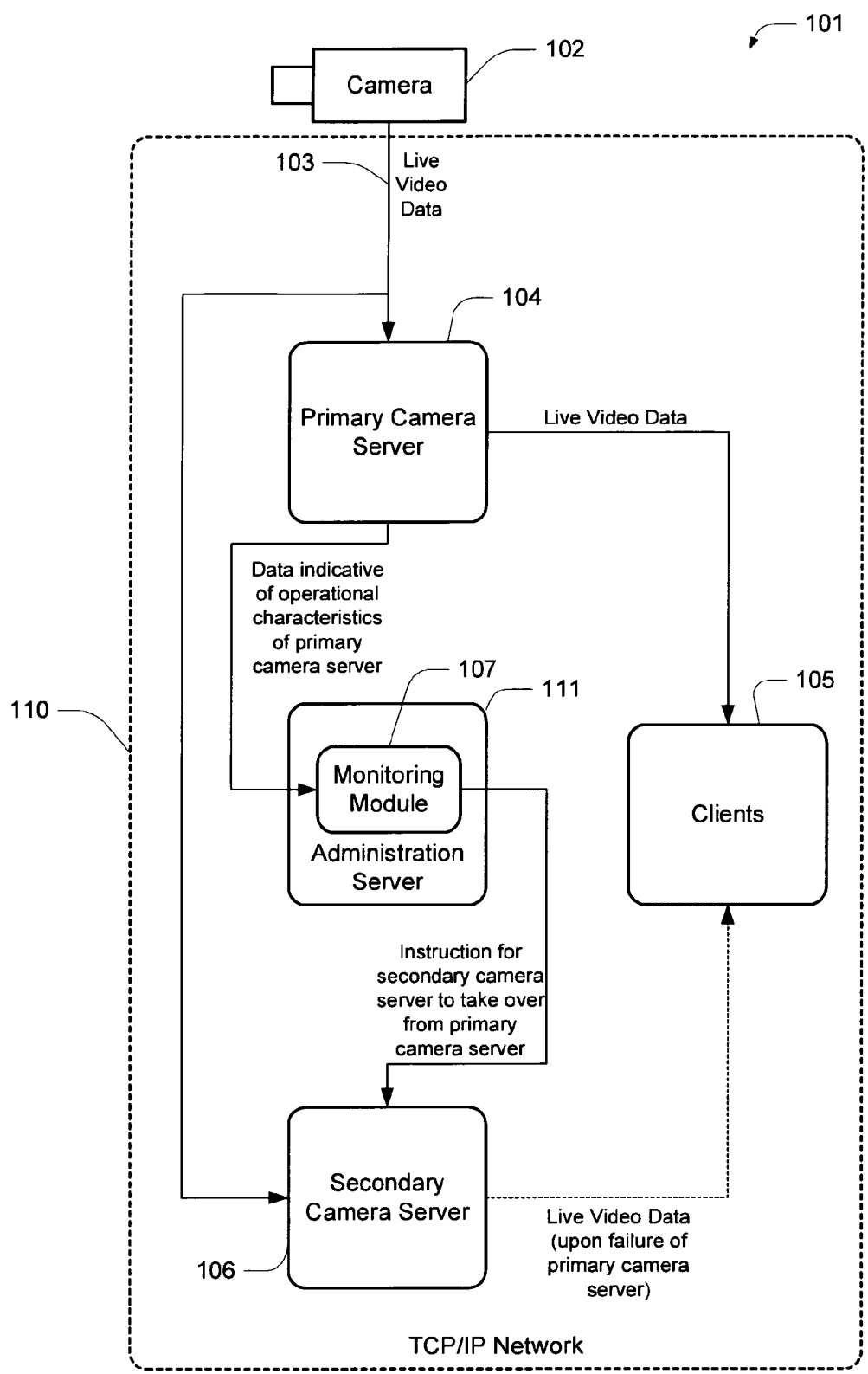
FIG. 1C is a schematic representation of a system for managing live video data according to one embodiment.

The method of operation of module 107 varies between embodiments. For example, in the example of FIG. 1B, module 107 runs on camera server 106, whilst in the example of FIG. 1C module 107 runs on an administration server 111. Furthermore, in some embodiments the monitoring module passively receives the input indicative of one or more operational characteristics. That is, the operational characteristics are provided to module 107 by one or more other components. However, in other embodiments the monitoring module actively obtains the input indicative of one or more operational characteristics. That is, the monitoring module engages in active monitoring of components, or in some cases it engages in monitoring of a database or one or more other information repositories that maintain data indicative of the operational characteristics.

In some embodiments, where multiple monitoring modules are used, a prioritization protocol is implemented to manage relationships between the individual monitoring modules. Such an approach is predominately to reduce the possibility of two modules taking inconsistent actions in response to a common event.

Figure 1D:
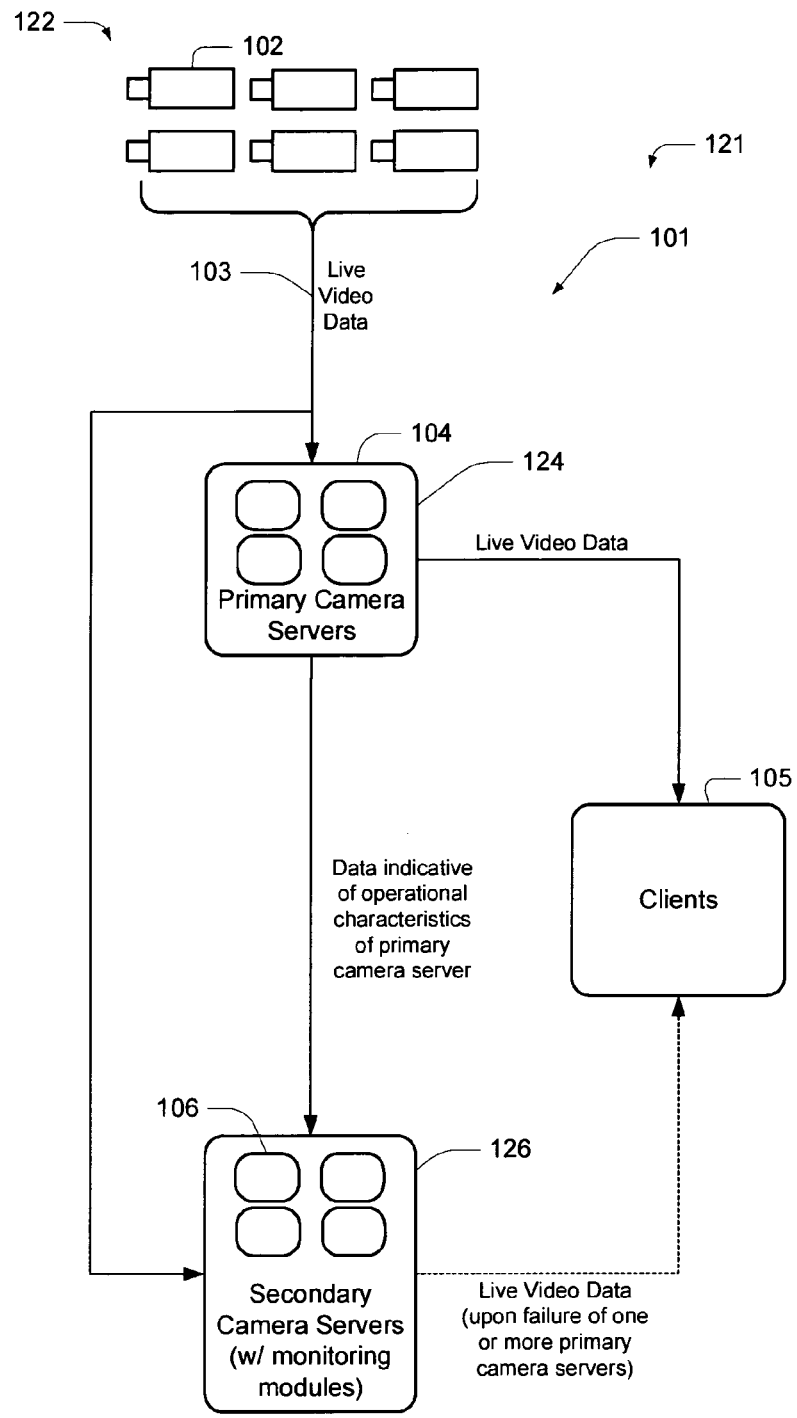
FIG. 1D is a schematic representation of a system for managing live video data according to one embodiment.

FIG. 1D illustrates a video management system 121, this figure illustrating a greater number of cameras than in previous figures. System 121 includes a plurality of cameras 122 for providing respective video data 103. This includes camera 102. System 121 also includes a plurality of primary camera servers 124, including camera server 104. These are each initially configured to make video data from an assigned one or more of cameras 122 available in real time to clients 105.

A plurality of secondary camera servers 126, including camera server 106, are each initially assigned as a backup for one or more of primary camera servers 124. In examples where a single monitoring module 107 is provided, that module assesses input indicative of one or more operational characteristics of each of the primary camera servers. In the case that one or more of the operational characteristics for a given primary camera server meet predefined criteria, the module configures the secondary camera server assigned as a backup for that primary camera server to make available to the one or more clients the video data which the relevant primary camera server was initially configured to make available.

In cases where a plurality of monitoring modules are used (such as like modules executing on different camera servers, the modules assess input indicative of one or more operational characteristics of one or more of the primary camera servers and, in the case that one or more of the operational characteristics for a given primary camera server meet predefined criteria, configures the secondary camera server assigned as a backup for that primary camera server to make available to the one or more clients the video data which the relevant primary camera server was initially configured to make available.

The manner by which a monitoring module configures a secondary camera server varies between embodiments. In one embodiment it is a direct configuration whereby configuration settings of the camera server are accessed and modified by the monitoring module. In another embodiment it is an indirect configuration, whereby the monitoring module provides a signal indicative of an instruction to configure a camera server, and another component is responsible for performing the actual configuration.

The numerical relationships between cameras, primary camera servers, secondary camera servers, and clients are discussed below:

Each primary camera server has assigned to it one or more cameras.

Each secondary camera server is assigned to be a backup for one or more primary camera servers. At one end of the spectrum, in some embodiments there is only one backup camera server for a given system. At the other end of the spectrum, in some embodiments there is a one-to-one relationship between primary camera servers and secondary camera servers. Various embodiments adopt an approach in between these ends, whereby there is a plurality of secondary camera servers, and each is assigned to be a backup for between about two and ten primary camera servers.

The number of clients is not directly related to the number of cameras or camera servers. For example, in some embodiments there are a large number of clients and a small number of camera servers (for example between 2 and 5 camera servers and 10 to 100 clients), in some embodiments there are a small number of clients and a large number of camera servers (for example 1 to 10 clients and 20 to 100 camera servers). In some embodiments there a one-to-one relationship, or close to a one-to-one relationship between clients and camera servers.

Figure 1E:
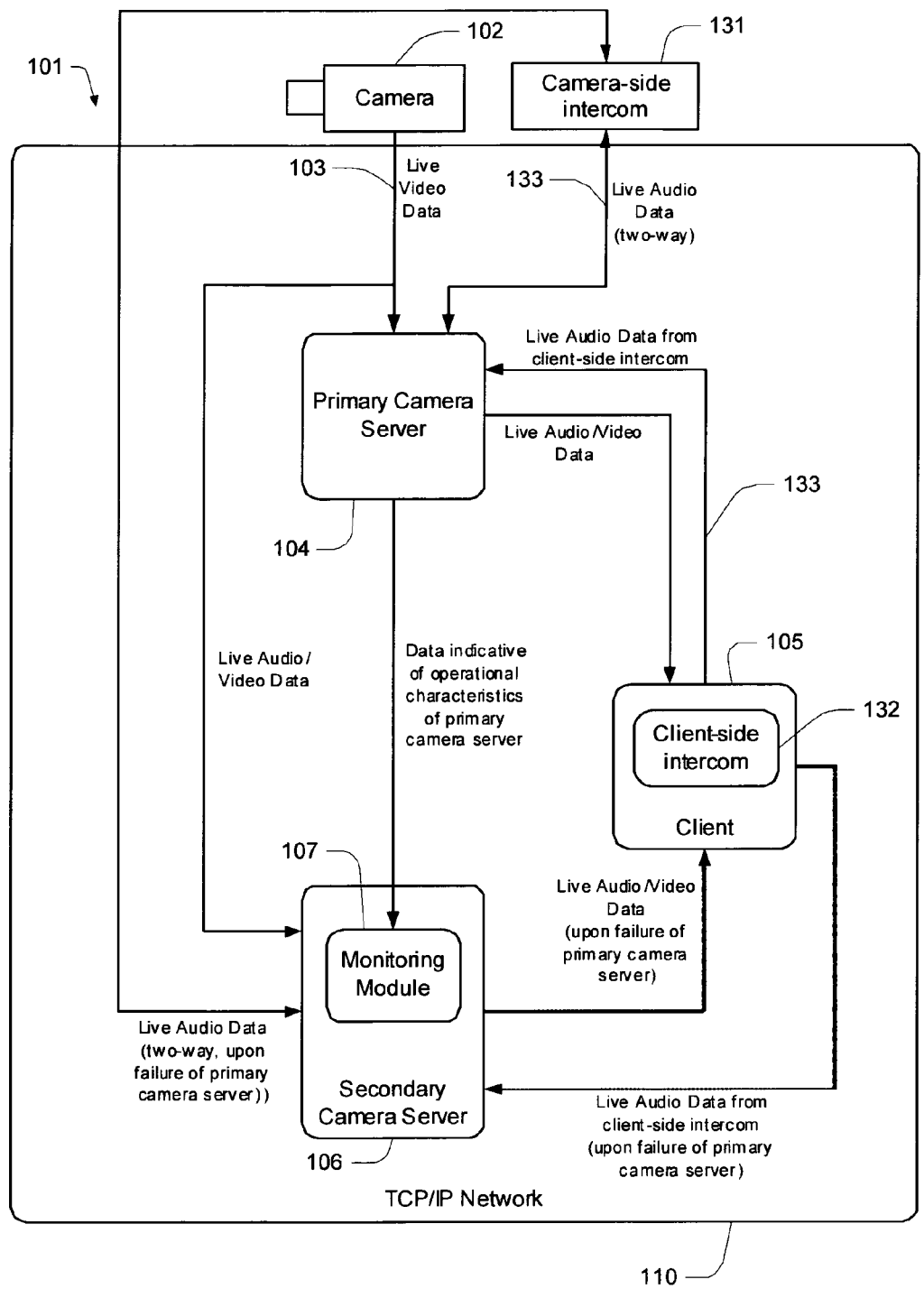
FIG. 1E is a schematic representation of a system for managing live video data according to one embodiment.

FIG. 1E illustrates a further embodiment where video-based surveillance operates in conjunction with an audio-based intercom system. In particular, the intercom system includes a camera-side intercom unit 131 and a server-side intercom unit 132. The former includes a microphone and speaker, either of which may be integrated with the camera. The latter also includes a microphone and speaker, which may be coupled to a PC on which the client executes. Audio data is gathered at either of these units, for example by way of a microphone, and transmitted to the other to allow two-way communication. In the present embodiment audio data is transmitted via the primary camera server.

In the illustrated embodiment, live audio data 132 from intercom units 131 and 132 is provided to camera server 104 much in the same manner as video data 103 (noting that intercom units 131 and 132 define two sources of audio data). More specifically, the camera server is able to record, or arrange for the recording of, corresponding audio and video data.

Also in a similar manner to the video data, the audio data is diverted to secondary camera server 106 upon failure of camera server 104, subject to operation of the monitoring module. As such, similar redundancy-based protection is afforded to both video data and audio data corresponding to this video data. It will be appreciated that, upon failover, audio data from the client side intercom is routed to the secondary camera sever in additional to camera-side audio and video data.

In some embodiments along the lines of FIG. 1E, audio data is routed through an "audio server" rather than a camera server, this audio server having a similar redundant backup arrangement as a camera server described herein. That is, a monitoring module is responsible for configuring a secondary audio server to take over from a failed (or otherwise unavailable) audio server.

Figure 1F:
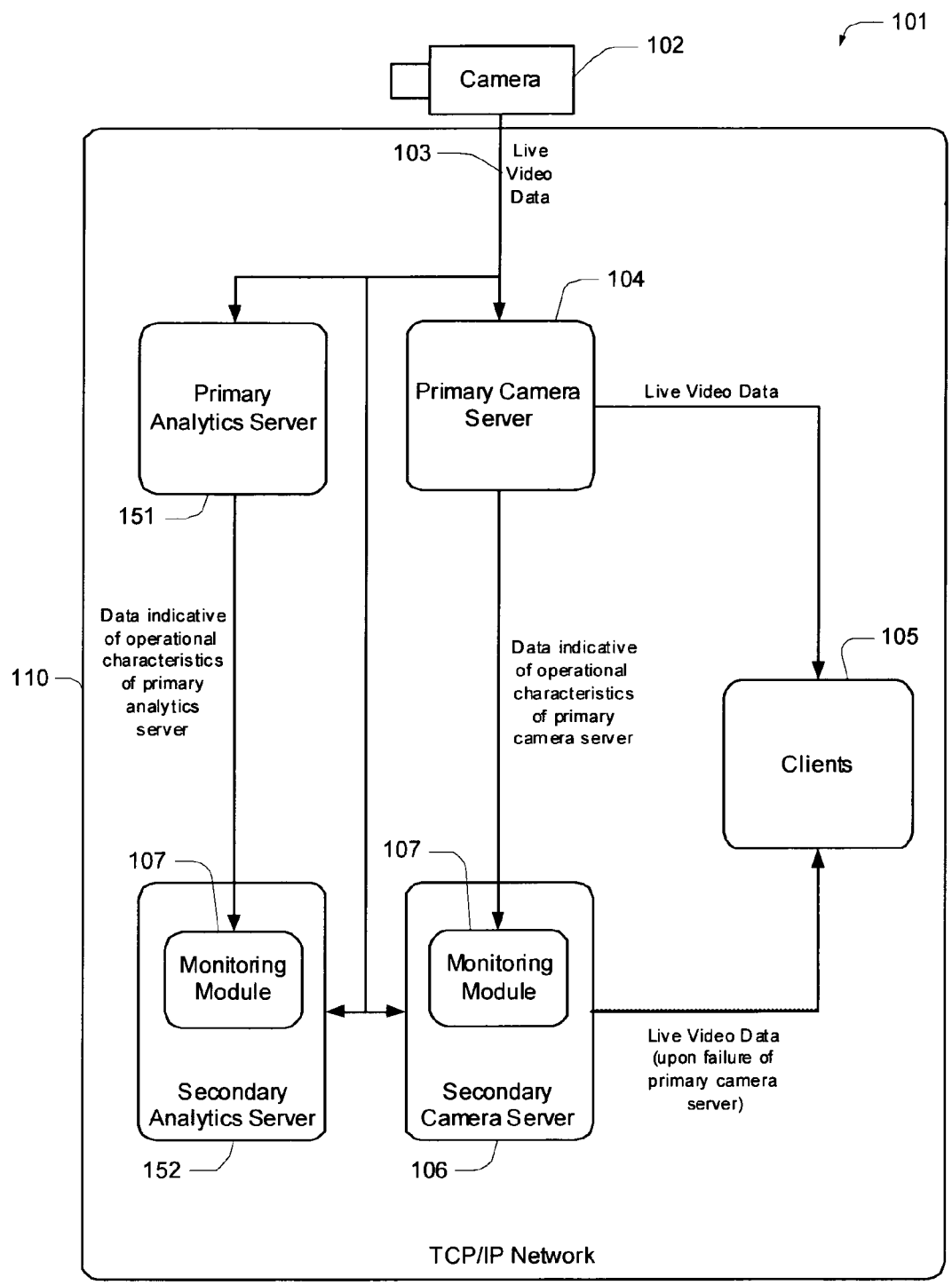
FIG. 1F is a schematic representation of a system for managing live video data according to one embodiment.

FIG. 1F illustrates a further embodiment wherein an analytics server 151 also obtains live video data from camera 102. In overview, this analytics server is responsible for performing various analytical processes on video data, thereby to raise alarms, log events, and so on. Specifically, an analytics server has assigned to it one or more roles, which describe processes that are to be performed and video data to which those processes are to be performed. A common example is a process whereby movement is detected, this triggering the storage of video data for a period of time generally corresponding to the time of detected movement (often with a portion beforehand and afterward).

In this embodiment, a monitoring module 107 executes on a secondary analytics server 152, and monitors primary analytics server 151 to determine whether predetermined conditions are met. When those conditions are met (typically occurring in a situation where it is inferred that server 151 has failed or the like), module 107 configures the analytics server 152 to take over the analytics role and or roles assigned that were previously assigned to server 151.

In embodiments where there are multiple camera servers, there is not necessarily a one-to-one relationship between camera servers and analytics servers. In some cases there are more or fewer analytics servers than camera servers.

Figure 1G:
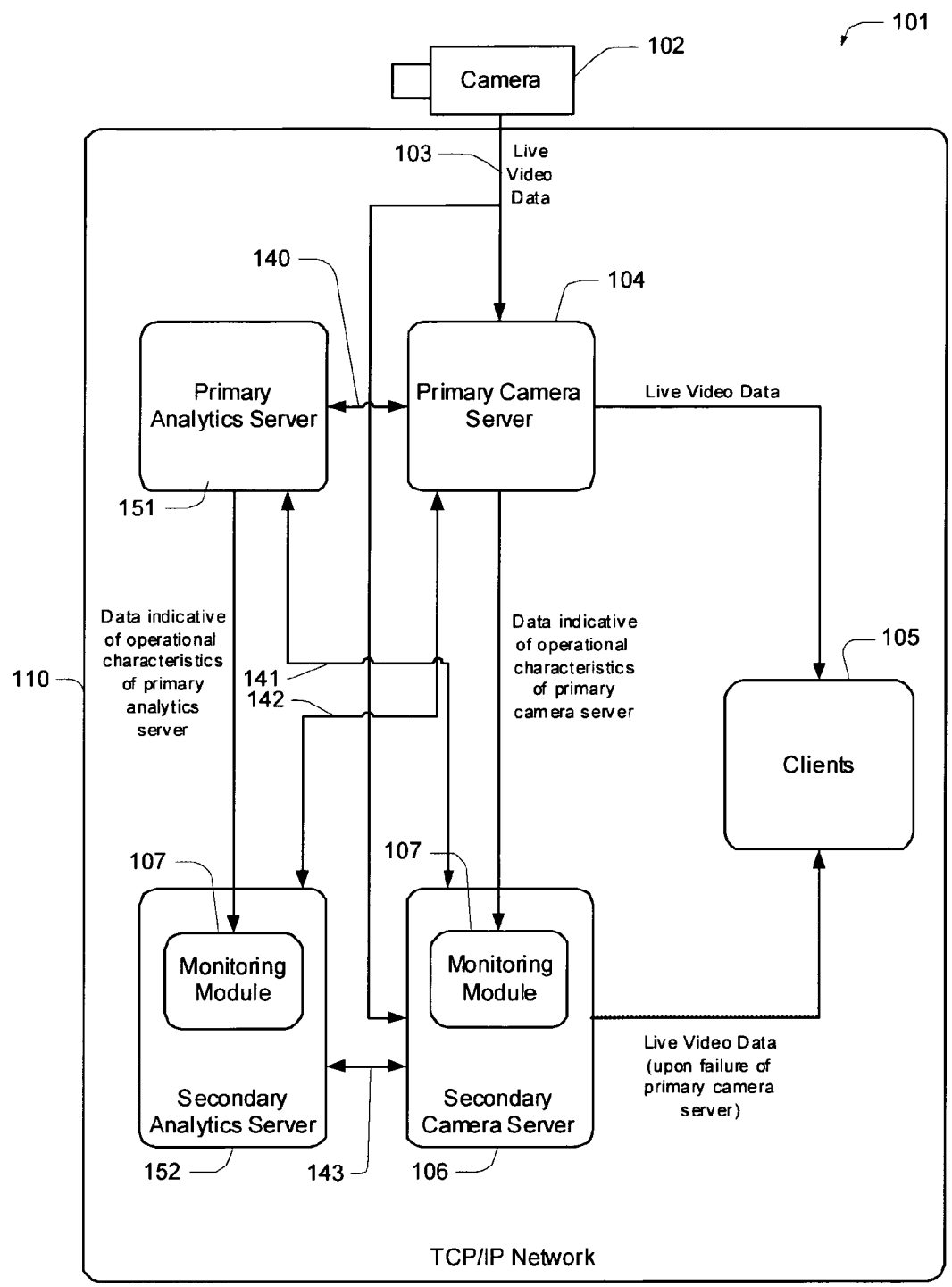
FIG. 1G is a schematic representation of a system for managing live video data according to one embodiment.

In the embodiment of FIG. 1G, the primary analytics server 151 obtains live video data from one or more primary camera servers (much in the same way as a client obtains this data). In this manner, the primary analytics server is assigned to one or more camera servers (or, from an alternate perspective, one or more camera servers are assigned to the primary analytics server). In some embodiments there are multiple primary analytics servers assigned to a single camera server. In other embodiments a single primary analytics server is assigned to multiple camera servers. In some cases there is a one-to-one relationship.

The ratio of primary analytics servers to secondary analytics servers varies between embodiments, much in the same manner as the ration between primary and secondary camera servers, as described elsewhere in this document.

The examples of FIG. 1F and FIG. 1G show a monitoring module 107 executing on the secondary analytics server. However, in other embodiments the monitoring module resides elsewhere on the network. In some cases a single monitoring module and shared among multiple secondary analytics servers (and optionally one or more secondary camera servers).

In the example of FIG. 1G, lines 140 to 143 represent communications between camera servers and analytics servers. When both primary servers are functional, communication is via line 140. Where both fail, communication is vial line 143. Lines 141 is used upon failure of the primary camera server, and line 142 is used upon failure of the primary analytics server.

It will be appreciated that, in various embodiments, analytics is a functionality of a camera server rather than a separate server.

Figure 2:
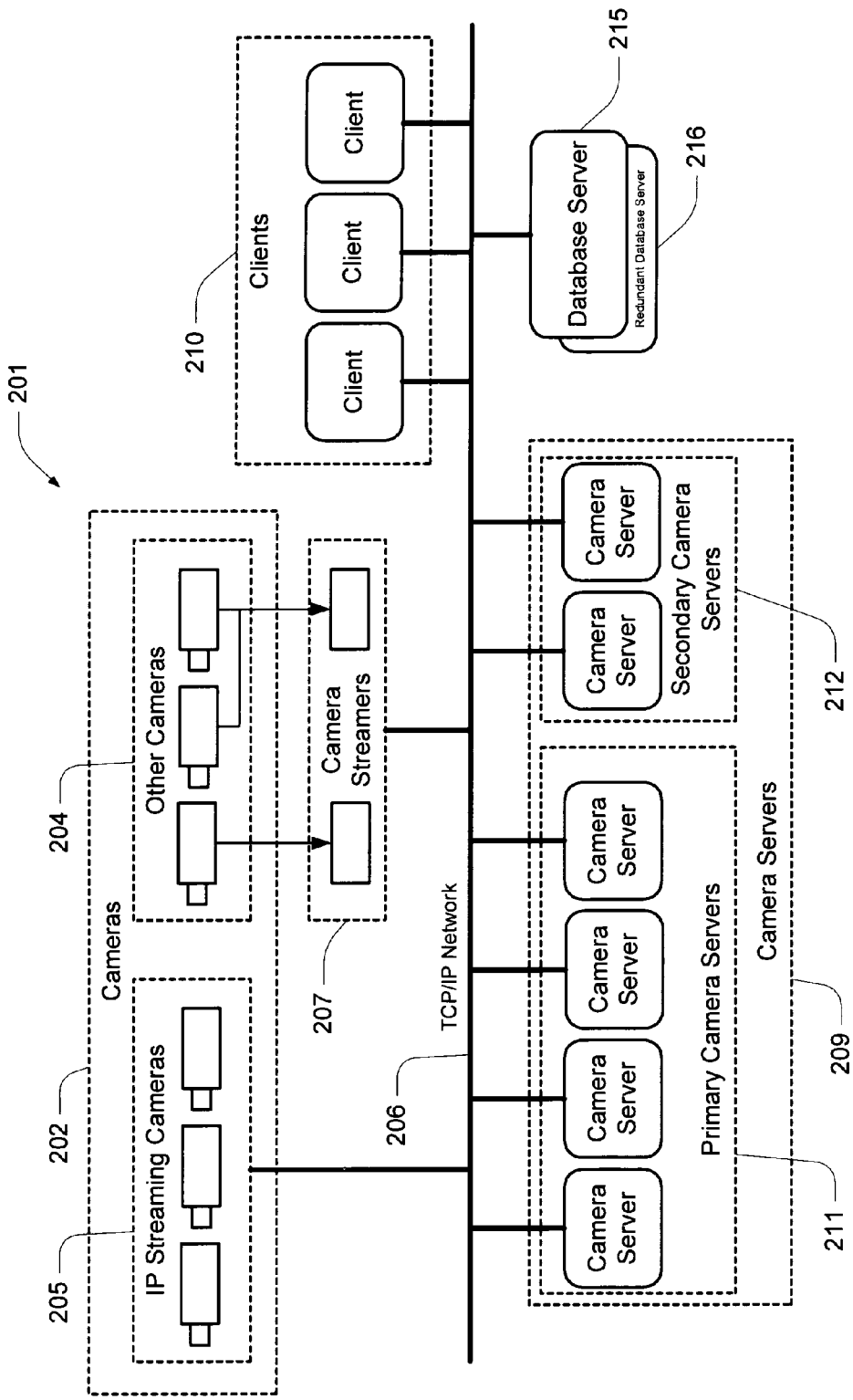
FIG. 2 is a schematic representation of a system for managing live video data according to one embodiment.

Embodiments are described below in more detail by reference to video surveillance systems where one or more cameras are used to stream video data, in the form of surveillance footage, over a network. An example of such a system is shown in FIG. 2. Other embodiments are implemented in the context of alternate video systems.

The term "video data" should be read broadly to include substantially any form of data indicative of vision captured at an optical device such as a camera. Video data is typically indicative of a number of sequential frames (images) that are rendered and played back sequentially to allow viewing. Video data may also include additional information—for example in some embodiments video data includes corresponding audio data and/or source/time identification information. In some cases there is additional metadata. In some embodiments described herein, the video data takes the form of surveillance footage. The terms "video data" and surveillance footage" are used synonymously in respect of these embodiments, and the latter term is introduced primarily for the sake of convenient explanation in the context of a surveillance system.

In the present context, video data predominately refers to live video data, and there is also discussion of this video data being made available in "real time". That is, video data captured at a camera, and subsequently made available for viewing, without being necessarily stored on a carrier medium. There may be some buffering, however, the live video data is made available for viewing substantially at the same time as it is being captured. There is typically a minor delay due to transmission times, buffering, and so on, however such delays are relatively minor (typically the order of several seconds at most). The concepts of "live video data" and "real time" are particularly distinguished from cases where video data is read from a storage disk.

Referring to FIG. 2, a video management system, in the form of surveillance system referred to herein a Digital Video Management (DVM) system 201, includes a plurality of cameras 202. Cameras 202 include conventional cameras 204 (including analogue video cameras), and IP streaming cameras 205. Cameras 202 stream video data, presently in the form of surveillance footage, on a TCP/IP network 206. This is readily achieved using IP streaming cameras 205, which are inherently adapted for such a task. However, in the case of other cameras 204 (such as conventional analogue cameras), a camera streamer 207 is required to convert a captured video signal into a format suitable for IP streaming. A plurality of digital cameras 204 can be connected to a single streamer 207, however it is preferable to have the streamer in close proximity to the camera, and as such multiple streamers are often used. In some embodiments one or more of the IP streamers are integrated with camera servers.

Two or more camera servers 209 are also connected to network 206. Each camera server is enabled to have assigned to it one or more of cameras 202. This assignment is carried out using a software-based configuration tool, and it follows that camera assignment is virtual rather than physical. That is, the relationships are set by software configuration rather than hardware manipulation. In practice, each camera has a unique identifier. Data indicative of this identifier is included with surveillance footage being streamed by that camera such that components on the network are able to ascertain from which camera a given stream of surveillance footage originates. Each camera server makes available, in real time to one or more clients 210, surveillance footage from its assigned one or more of the cameras. In some embodiments this includes simply re-broadcasting the video footage, whilst in other embodiments there are additional aspects such video as buffering and/or compression. Each camera server optionally performs additional functionalities, such as providing the one or more clients with control of the assigned one or more cameras (including mechanical and optical controls), and in some cases performing analytics in respect of captured footage.

It will be appreciated that, at a conceptual level, the assignment of one or more cameras to a common camera server is no different from a camera server being assigned to one or more cameras.

Clients 210 are, in the present embodiment, software applications. These respectively execute on (or are viewable/controllable via) client terminals, which in some embodiments include all computational platforms on network 206 that are provided with appropriate software and/or permissions. Clients 210 provide a user interface that allows surveillance footage to be viewed in real time by an end-user. In some cases this user interface is provided through an existing application (such as Microsoft Internet Explorer), whilst in other cases it is a standalone application. In some cases the substantive code required to implement one or more aspects of the software application is maintained remotely of the client terminal (particularly in web-browser type implementations).

The user interface optionally provides the end-user with access to other system and camera functionalities, including the likes of including mechanical and optical camera controls, control over video storage, and other configuration and administrative functionalities (such as the assignment and reassignment of cameras to camera servers). Typically clients 210 are relatively "thin", and commands provided via the relevant user interfaces are implemented at a remote server, typically a camera server. In some embodiments different clients have different levels of access rights. For example, in some embodiments there is a desire to limit the number of users with access to change configuration settings or mechanically control cameras.

Camera servers 209 include one or more primary camera servers 211 and one or more secondary camera servers 212. In the event that there are only two camera servers, one is a primary camera server and one is a secondary camera server. However, in many embodiments, there are between two and ten times as many primary camera servers as secondary camera servers, each secondary camera server being assigned as a backup for between two and ten primary camera servers.

In the present embodiment, a primary camera server is essentially no different from a secondary camera server, at least from a hardware perspective. The difference resides at a software or configuration level. The net result is that a plurality of like camera servers are physically installed, and later configured (for example remotely by way of a software application running on a client terminal) to be either primary camera servers or secondary camera servers. Moreover, the primary/secondary nature of a camera server can be varied over time either from primary to a secondary or vice versa. As a point of distinction, in the present example each secondary camera server executes a monitoring module, in the form of a monitor service 204. Primary camera servers do not execute this monitoring module, although they may have the software required for such execution installed.

System 201 also includes a database server 215. Database server 215 is responsible for maintaining various aspects of information relating to configuration and operational characteristics of system 201. The role of database 201 in relation to the implementation of monitoring modules 214 is discussed in more detail below, in the context of FIG. 3. In the present example, the system makes use of a preferred and redundant database server (215 and 216 respectively), the redundant server essentially operating as a backup for the preferred server. The relationship between these database servers is generally beyond the concern of the present disclosure.

Figure 3:
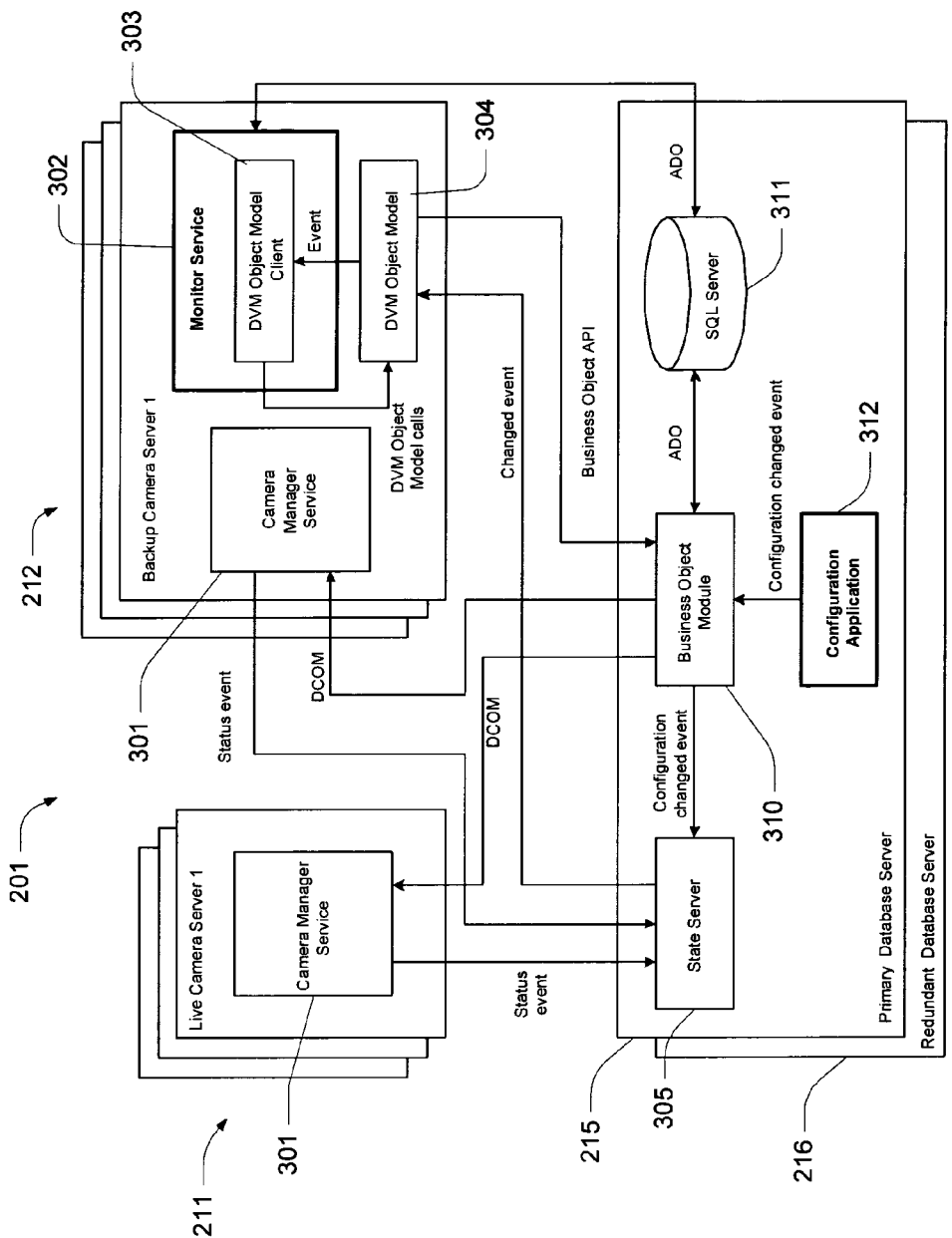
FIG. 3 is a schematic representation of a system for managing live video data according to one embodiment.

FIG. 3 provides an alternate schematic view of system 201, this view schematically showing services that execute on the primary camera servers, backup camera servers, and database server (or servers in the case, such as the present, where a redundant database server is implemented).

A Camera Manager Service 301 executes on each camera server 209. This service is responsible for providing clients 210 (not shown in FIG. 3) access to functionalities of cameras 202 assigned to that camera server 209. These functionalities include the ability to view surveillance footage in real time, and to control the camera in an optical (zoom, etc) and mechanical (pivot, etc) manner. In some instances this latter functionality is not provided—for example where fixed cameras are used. In this embodiment, there are initially no cameras assigned to a secondary camera server 212, and as such Camera Manager Service 301 has limited functionality on the secondary camera server 212 at that time.

In addition to the Camera Manager Service, secondary camera servers 212 execute a Monitor Service 302. This Monitor Service is essentially responsible for assessing input indicative of one or more operational characteristics of the one or more of the primary camera servers—specifically those camera servers for which the secondary camera server in question is assigned as a backup. In the illustrated embodiment, this is in part achieved by the use of a DVM Object Model Client 303 and a DVM Object Model 304.

In the present embodiment, DVM Object Model 304 is representative of a system-wide protocol implemented for the configuration and management of the DVM system as a whole, including the generation of CameraServerHealthChanged messages when the "health" of a camera server changes, and the provision an effective method to manipulate cameras 202. The DVM Object Model is implemented in known systems, including systems developed and distributed by Honeywell. Alternate approaches are adopted in other systems, such as systems developed and/or distributed by other parties, and those approaches are implemented in other embodiments of the present system.

Reliance on CameraServerHealthChanged messages is not present in all embodiments. Rather, in some embodiments, it is replaced by or supplemented with an active process that performs continual/periodic diagnostic checks on camera servers so as to allow the performance of health analysis.

In some embodiments the monitor service executes on primary camera servers as well as secondary camera servers.

Object Model 304 receives, over the network, signals indicative of state changes from a State Server 305 executing on database server 215, and communicates events to Client 303 within Monitor Service 302. The Monitor Service is therefore in a position to assess these events, which are indicative of operational characteristics of camera servers. An example of how this assessment occurs is discussed below by reference to FIG. 5.

Exemplary techniques for implementing monitoring functionality are provided for the sake of illustration only, and should not be regarded as limiting in any way. In other embodiments alternate techniques are used. For example, in some embodiments an alternate monitoring module executes either on the secondary camera servers, on the database server, or on another distinct administration server. In some embodiments, such as where the monitoring module executes either the database server, or on another distinct administration server, a single monitoring module operates to affect a plurality or all secondary camera servers in the system. In some embodiments, such as that illustrated, the monitoring module passively receives the input indicative of one or more operational characteristics of the primary camera servers, and in other embodiments the monitoring module actively obtains the input indicative of one or more operational characteristics of the primary camera servers.

As noted above, Object Model 304 receives, over the network, signals indicative of state changes from a State Server 305. State Server 305 continually receives, over the network, signals indicative of status events from Camera Manager Services 301. These signals are indicative of operational characteristics, and indicate whether each camera server 209 is operating appropriately. For example, state changes indicate changes in:

The connection status of the connection between a camera server and the network.
The operational status of a camera sever.
The execution status of the Camera Service Manager.

These factors affect the "health" of a camera server. A camera server is "healthy" when it is in a position to provide real time video access to clients, and otherwise is "unhealthy". As foreshadowed, the State Server implements a system wide DVM Object Model such that CameraServerHealthChanged messages are generated and broadcasted when the health of a camera server changes, and these are subsequently assessed by the Monitor Service.

Database server 215 also provides a business object module 310, SQL server 311, and configuration application 312. The configuration application provides clients with the ability to perform administrative functions, such as camera assignment, camera reassignment, and the assignment and reassignment of backup (secondary) camera servers. Configuration changes are communicated to module 310, and provided to SQL server 311 via ActiveX Data Object (ADO). ADO, in the illustrated embodiment, is also used to allow two-way communication between the Monitor Service and SQL server. However, in some embodiments the Monitor Service communicates with the SQL server via module 310, using a Distributed Component Object Model (DCOM). This effectively allows a database server to be isolated from other components, resulting in a reduction of database compatibility concerns. Module 310 also uses DCOM to communicate camera assignment/reassignment information to the Camera Manager Services executing on primary and secondary camera servers.

Clients use database server 215 to provide users with information regarding the system, and in some cases with the ability to perform configuration tasks. For example, in one embodiment a client provides a Graphical User Interface (GUI) for displaying, in respect of each camera server, an identifier, status (primary or secondary), data indicative of assigned cameras or assigned backup status, and health details. This GUI is optionally used to modify camera assignment (i.e. manual reassignment of cameras) or the assignment of backup secondary servers to primary servers.

Figure 4:
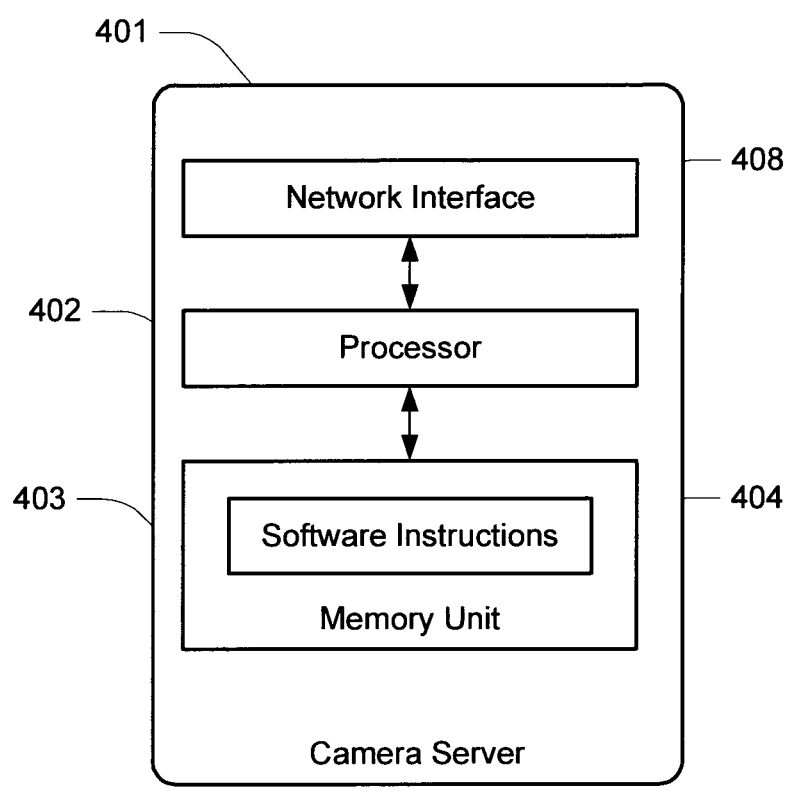
FIG. 4 is a schematic representation of a camera server.

FIG. 4 provides a schematic representation of a camera server 401, being an exemplary camera server for use in system 201. This camera server is enabled to operate as either a primary camera server or a secondary camera server. Camera server 401 includes a processor 402 in combination with a memory module 403. Module 403 includes software instructions 404 that, when executed on processor 402, allow server 401 to provide the functionalities such as those associated with services 301 and 302, and the DVM Object Model. These software instructions further allow the camera server to perform various methods discussed herein. However, in some embodiments the performance of such methods includes the use of software instructions maintained elsewhere in system 201. Camera server 401 also includes a network interface 408 for communicating with other devices on the network, including cameras, clients, and the database server.

Figure 5:
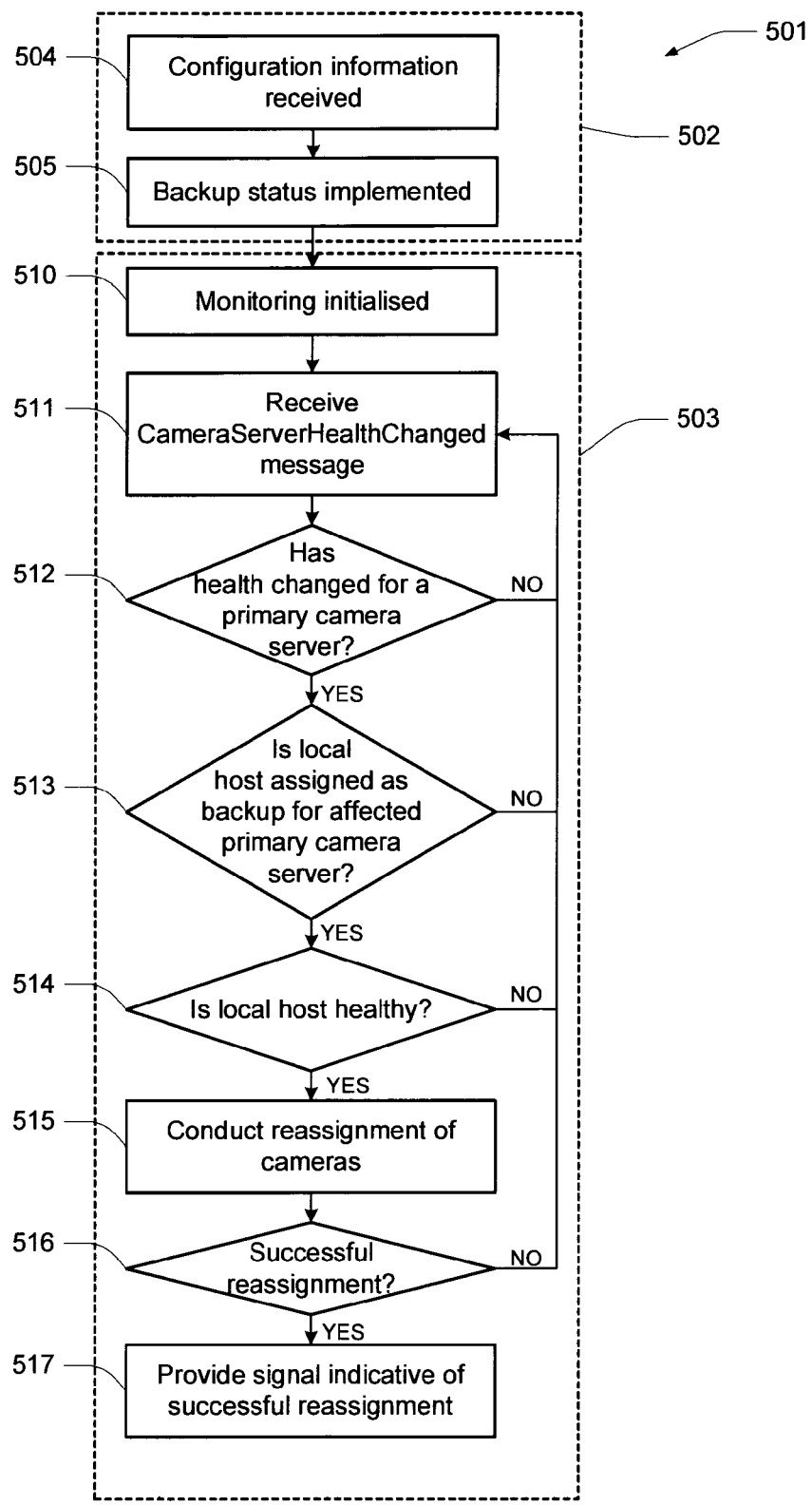
FIG. 5 shows a method for managing live video data according to one embodiment.

FIG. 5 shows a method 501 for operating a secondary camera server. As will be appreciated from discussions herein, a secondary camera server is essentially a "backup camera server". In the context of system 201, this method is performed based on software instructions carried by a camera server. However, in other embodiments the method is performed based in whole or in part on software instructions located elsewhere in system 201.

In broad terms method 501 includes processes 502 and 503. Process 502 includes configuring the secondary camera server to be a backup for a selection of the primary camera servers on a network. Process 503 includes assessing input indicative health changes of camera servers and, where appropriate, configuring the secondary camera server to take over from a failed primary camera server. In taking over, the cameras initially assigned to the failed primary camera server are automatically reassigned to the secondary server. In the present embodiment, following this process, the secondary camera server becomes a primary camera server, as discussed in more detail further below.

In the present embodiment, process 502 includes a sub-process 504 where backup status configuration information is received by the camera server (that is, data indicative of the primary camera servers for which the secondary camera server in question is a backup), and a sub-process 505 where this status is implemented such that the Monitor Service is informed of the primary camera server (or servers) for which this secondary camera server is assigned as a backup. In the example of FIG. 2, data indicative of backup status is available from SQL server 311 via ADO. In other embodiments the Monitor Service uses DCOM to access server 311 via module 310.

In other embodiments alternate techniques are used to communicate backup status configuration information to secondary camera servers. For example, in some embodiments the Monitor Service, or a corresponding component, provides clients with direct access to provide backup status configuration information.

Process 502 commences at sub-process 510 where monitoring is initialized. At sub-process 511 the status of camera servers is monitored by way of CameraServerHealthChanged messages generated and provided via the DVM Object Model. At sub-process 512 a message is assessed to determine whether the health has changed for a primary camera server. In the case that the health has changed for a primary camera server, the method progress to sub-process 513. Otherwise, the method loops to sub-process 511.

At sub-process 513 it is considered whether the local host (the secondary camera server performing method 501) is assigned as the backup for the primary camera server which has undergone a change in health. In the case that the local host is a backup for that primary server, the method progresses to sub-process 514. Otherwise, the method loops back to sub-process 511.

At sub-process 514 it is considered whether the local host is healthy. It will be appreciated that there is little to be gained from reassigning cameras to an unhealthy secondary server. In the case that the local host is healthy, the method progresses to sub-process 515. Otherwise, the method loops back to sub-process 511. In some embodiments there is provided a tiered backup server system, with a tertiary camera server assigned as a backup for one or more a secondary camera servers, and in some embodiments there are further layers of backups. However, in some embodiments, the failure of both a primary camera server and its assigned backup secondary server leads to a need for manual intervention.

At sub-process 515 the reassignment of cameras is conducted. Specifically, those cameras initially assigned to the failed camera server are reassigned to the local host and, in the case that the reassignment is found to be successful at 516, data indicative of the reassignment is provided to SQL server 311 at sub-process 517 to complete process 503.

Figure 5A:
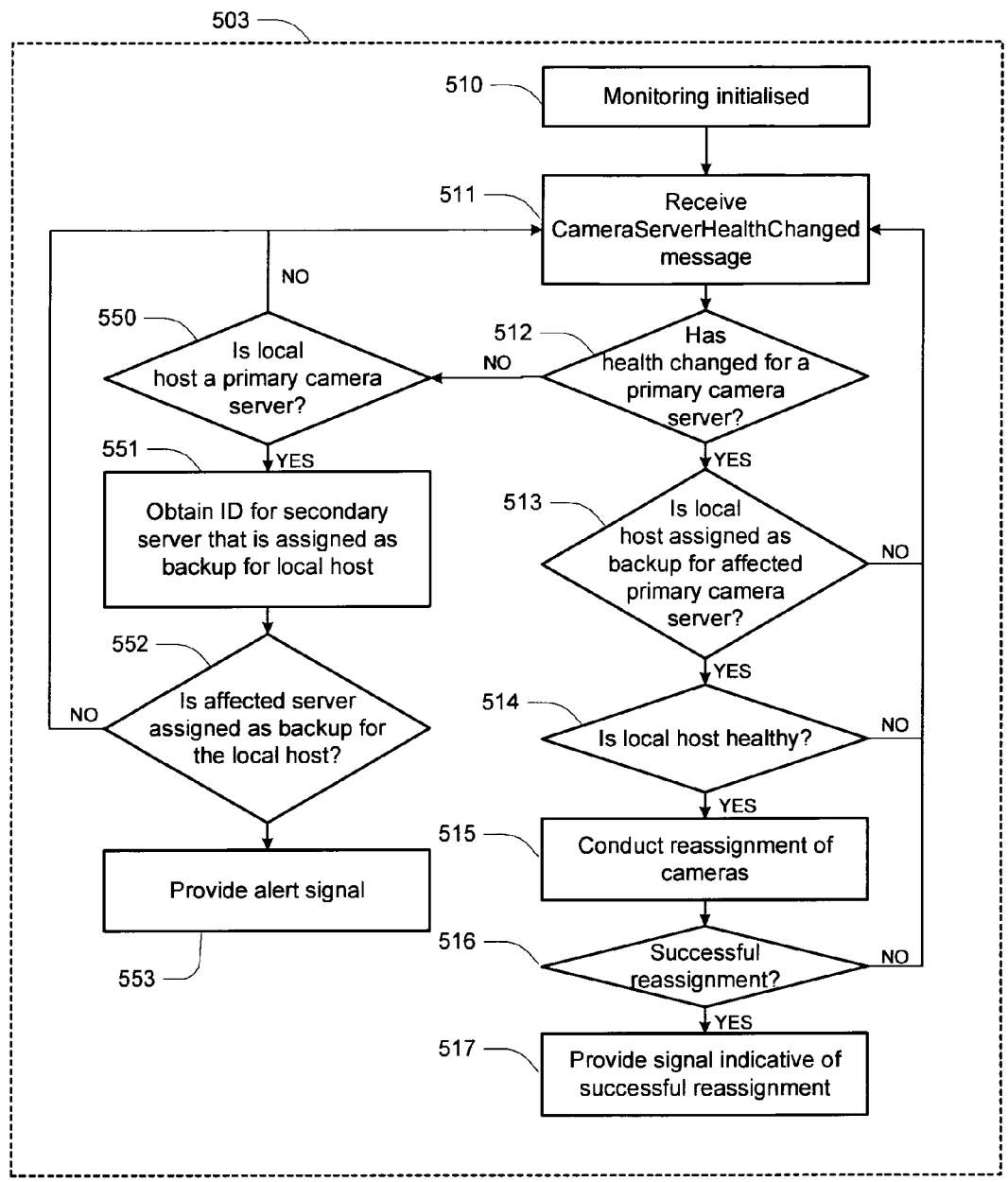
FIG. 5A shows a method for managing live video data according to one embodiment.

FIG. 5A illustrates an embodiment where the monitor service executes on primary camera servers as well as secondary camera servers. In this embodiment, following sub-process 512, the method progresses to sub-process 550 in the event that there has been a health change on a server other than a primary camera server (i.e. the health change is on a secondary camera server). At sub-process 550 it is assessed whether the local host is a primary camera server. If the local host is a primary camera server, the method progresses to sub-process 551. Otherwise, the method loops to sub-process 511.

Sub-process 551 includes obtaining the name of the secondary camera server assigned as a backup for the local host. At sub-process 552 it is assessed whether the health change affects that secondary camera server. If the health change does affect that secondary camera server, the method progresses to sub-process 553. Otherwise, the method loops to sub-process 511.

Sub-process 553 includes providing an alert to indicate that the local host is without a backup. In one embodiment this includes updating information maintained by database server 215 to show that the local host does not have a healthy backup.

In the present embodiment, upon completion of process 503, the secondary camera server becomes a primary camera server. That is, whilst a secondary camera server may be configured as a backup for more than one primary camera server, it is configured only to take over from one primary camera server at a time. As a result, if two primary camera servers that share a common secondary camera server as a backup both fail, there will be a loss of surveillance coverage from one of those failed servers.

Figure 6:
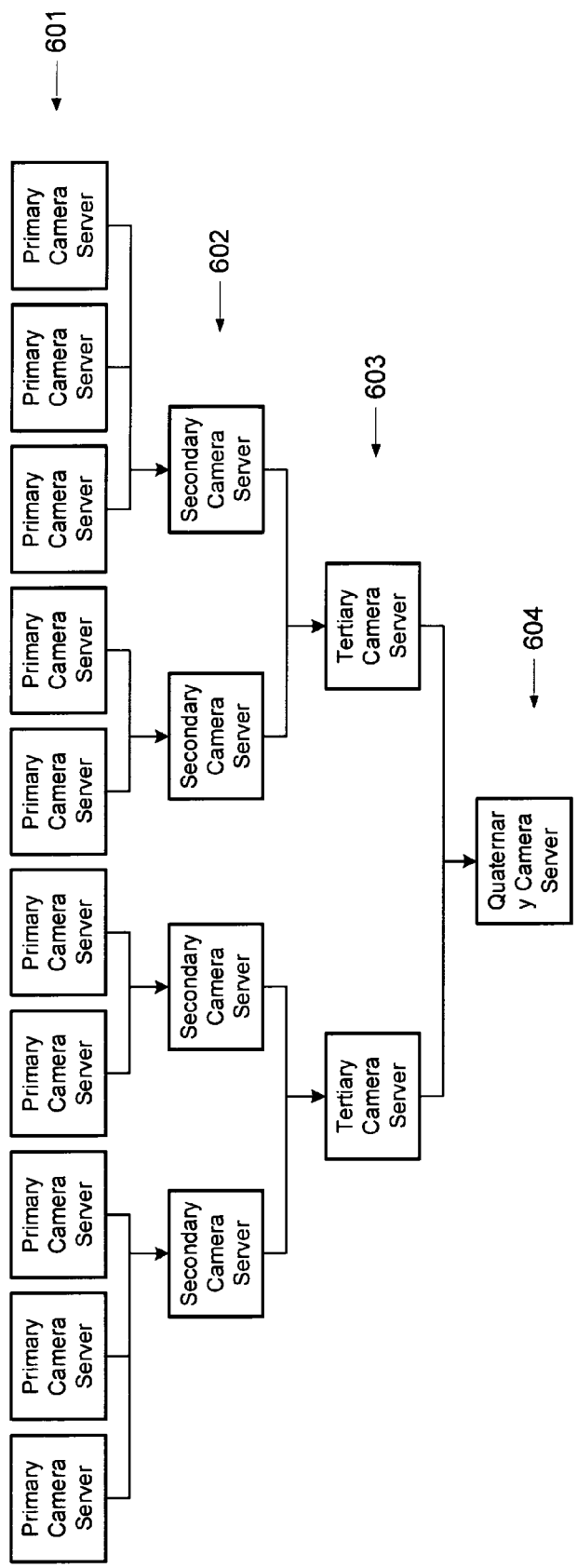
FIG. 6 is a schematic representation of a system for managing live video data according to one embodiment.

In some instances, techniques are implemented to manage the risk of multiple failures, such as:

In the example of FIG. 6, a tree structured backup arrangement is implemented. Primary camera servers 601 are backed up by secondary camera servers 602. These secondary servers are, in turn, backed up by tertiary camera servers 603. In the event that a secondary camera server is no longer available (due to either a failure in that secondary camera server itself, or due to a failure in on of the primary servers for which it is a backup—resulting in a reassignment of cameras to that secondary camera server), the tertiary camera server is assigned as a backup for those primary camera servers for which the secondary camera server was previously responsible. This is, in the illustrated embodiment, followed in a similar manner by a quaternary camera server 604. In other embodiments there are more or fewer layers. For example in one embodiment there are six layers of backup servers. Although the illustrated embodiment shows some symmetry, some embodiments adopt an asymmetrical approach so as to provide additional backup capabilities for more sensitive cameras than for less sensitive cameras, thereby to better manage the risk of footage loss from the more sensitive cameras based on a finite resource base.

Allowing a secondary camera server to take over from multiple primary camera servers. For example, in the case that the reassignment is found to be successful at 516, the method loops back to sub-process 511. Subsequently, additional cameras are able to be reassigned to that secondary camera server. In some embodiments this involves the use of a secondary camera server having additional hardware resources as compared to the primary camera servers.

Automatically redistributing backup assignments among the remaining secondary camera servers in the event that a given secondary camera server becomes unavailable.

In the present embodiment, where a primary camera server has failed and it is either subsequently repaired or replaced, that camera server will have no assigned cameras. At the option of an administrator, that server is either assigned cameras from an existing server (for example the secondary camera that took over from the failed server, and in doing so became a primary camera server), or assigned as a backup for one or more primary camera servers. In some embodiments this process is automated such that the most recent camera server connected to the network is automatically configured in the same manner as the last camera server to leave the network. In this context, a secondary camera server is taken to "leave" the network in the event that it becomes a primary camera server as a result of process 503. That is, although the server does not physically leave the network, the secondary server notionally leaves the network in the sense that it is, at least conceptually, replaced by a primary server (noting that the primary camera servers is, in terms of hardware, actually the secondary camera server).

It will be appreciated that, other than managing unpredictable camera server failures, the present systems and methods provide additional advantages. For example, in the context of server maintenance. In particular, it is possible to "hot swap" an operational primary camera server without necessarily having to perform additional configuration in advance. A primary server is simply removed from the network and, from an end-user perspective, there is no significant noticeable effect.

In the embodiments considered above, the secondary camera server is generally a redundant component until such a time as the monitoring module performs reconfiguration to convert it to a primary camera server. This is not always the case. In particular, FIG. 7A illustrates a further embodiment, in the form of a system 701, wherein a secondary camera server performs a buffering functionality at all or substantially all times.

Figure 7A:
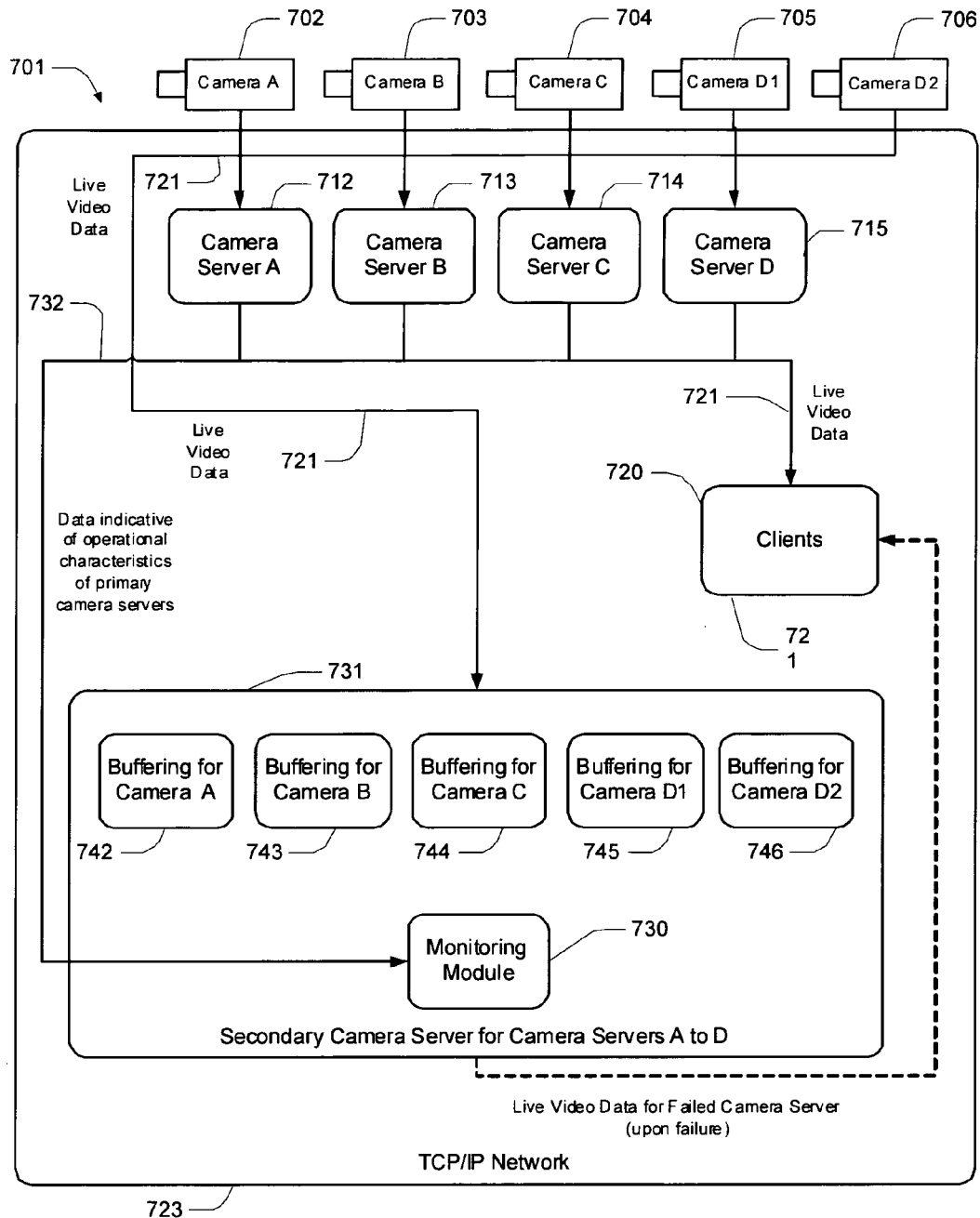
FIG. 7A is a schematic representation of a system for managing live video data according to one embodiment.

In the context of FIG. 7A, cameras 702 to 705 are respectively assigned to primary camera servers 712 to 715, with primary camera server additionally having assigned to it camera 706. These camera servers make available to clients 720 live video data 721 from their respectively assigned cameras over a TCP/IP network 723. A monitoring module 730 executes on a secondary camera server 731. This monitoring module assesses input in the form of data 732, which is indicative of one or more operational characteristics of the primary camera servers 712 to 715. In the case that one or more of the operational characteristics meet predefined criteria for a given one of camera servers 712 to 715, the monitoring module configures second camera server 731 to make the video data for that one of camera servers 712 to 715 available in real time to clients 704. In that manner, secondary camera server 731 is configured as a backup for camera servers 712 to 715.

In this example, whilst configured as a backup as a backup for camera servers 712 to 715, camera server 731 buffers a predetermined timeframe of live video data from each of cameras 702 to 706. These buffers are schematically designated by reference numerals 742 to 746, corresponding with cameras 702 to 706. The predetermined timeframe is, in some embodiments, between about 1 and 10 minutes. The general rationale for this approach is to retain a buffer of footage to cover a short period of time between a primary camera server failing, and the secondary camera server being configured to take over.

It will be appreciated that the buffering, in this instance, is based on video data obtained from the cameras themselves, rather than the primary camera servers.

In some embodiments analytics are performed for the buffered footage. However, in other embodiments analytics for the buffered footage is performed only where there has been a failure or the like. That is, upon reconfiguration of a secondary camera server, analytics of buffered footage for the failed (or similar) primary camera server's one or more cameras is conducted. It will be appreciated that such an approach reduces potentially unnecessary resource utilization.

In some embodiments camera server 731 remains as a secondary camera server for one or more of camera servers 712 to 715 following configuration to be the primary camera server for one of these servers. However, this is not the case in all embodiments. Generally speaking, it is a question of resources available at server 731. It will be appreciated that, in some cases, there are insufficient resources to allow for both buffering footage of multiple primary camera servers as well as conventional primary camera server operation for one or more cameras.

Figure 7B:
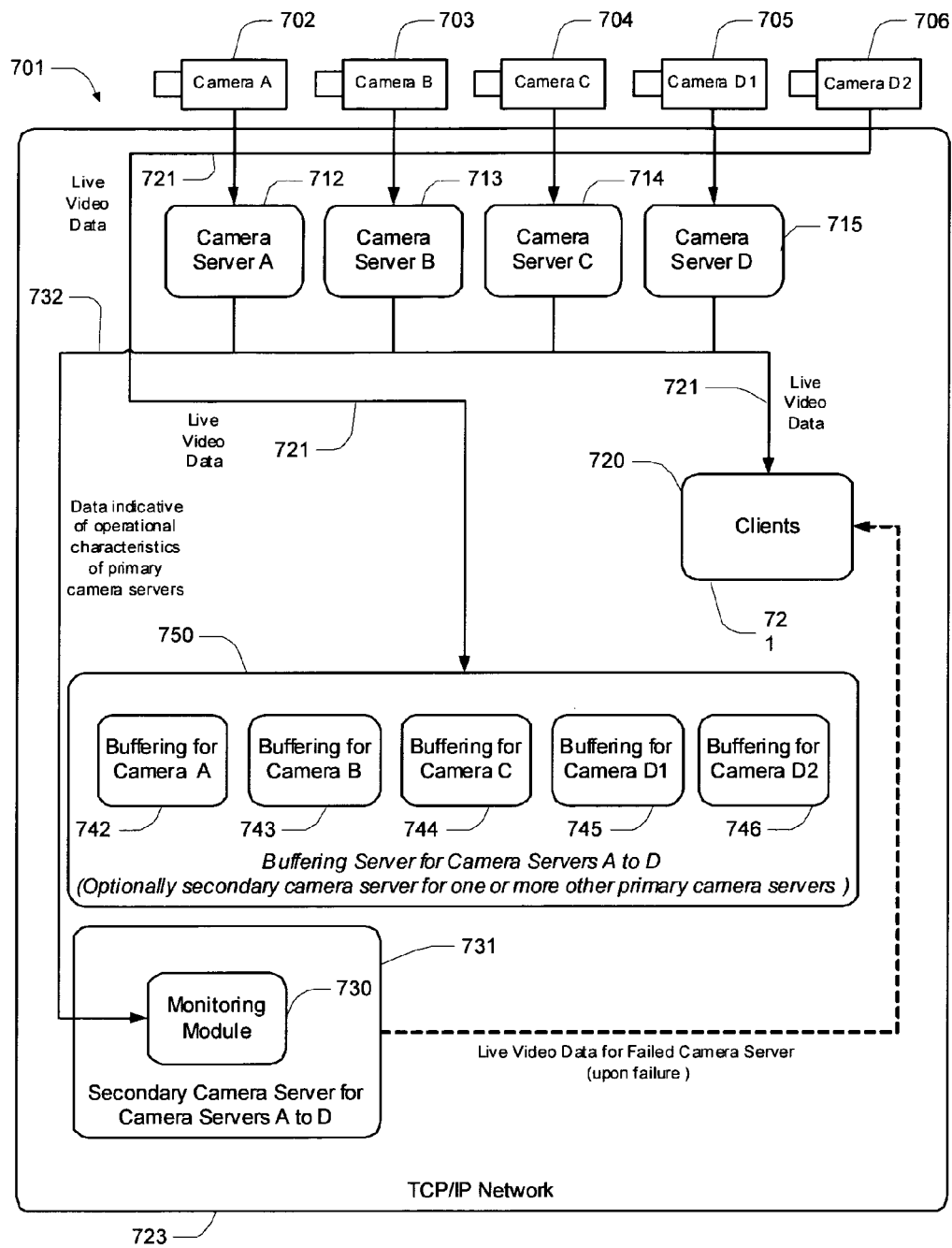
FIG. 7B is a schematic representation of a system for managing live video data according to one embodiment.

FIG. 7B illustrates a similar embodiment, however in this embodiment, buffering occurs at a buffering server 750, rather than secondary server 731. In some cases this buffering server is a secondary camera server for one or more primary camera servers other than camera servers 712 to 715. The general rationale is to allow buffering to continue uninhibited in the case of a failure of a primary server and during reconfiguration of the relevant secondary camera sever. As part of reconfiguration, in some embodiments the monitoring module provides an instruction to the buffering module to provide buffered footage from the camera or cameras concerned, such that the footage in question can be made available (for example by transfer to permanent storage), and such that analytics can be performed where appropriate.

It will be appreciated that the approaches of FIG. 7A and FIG. 7B are particularly useful in further reducing risks associated with lost footage in the case of camera server failure.

Figure 8:
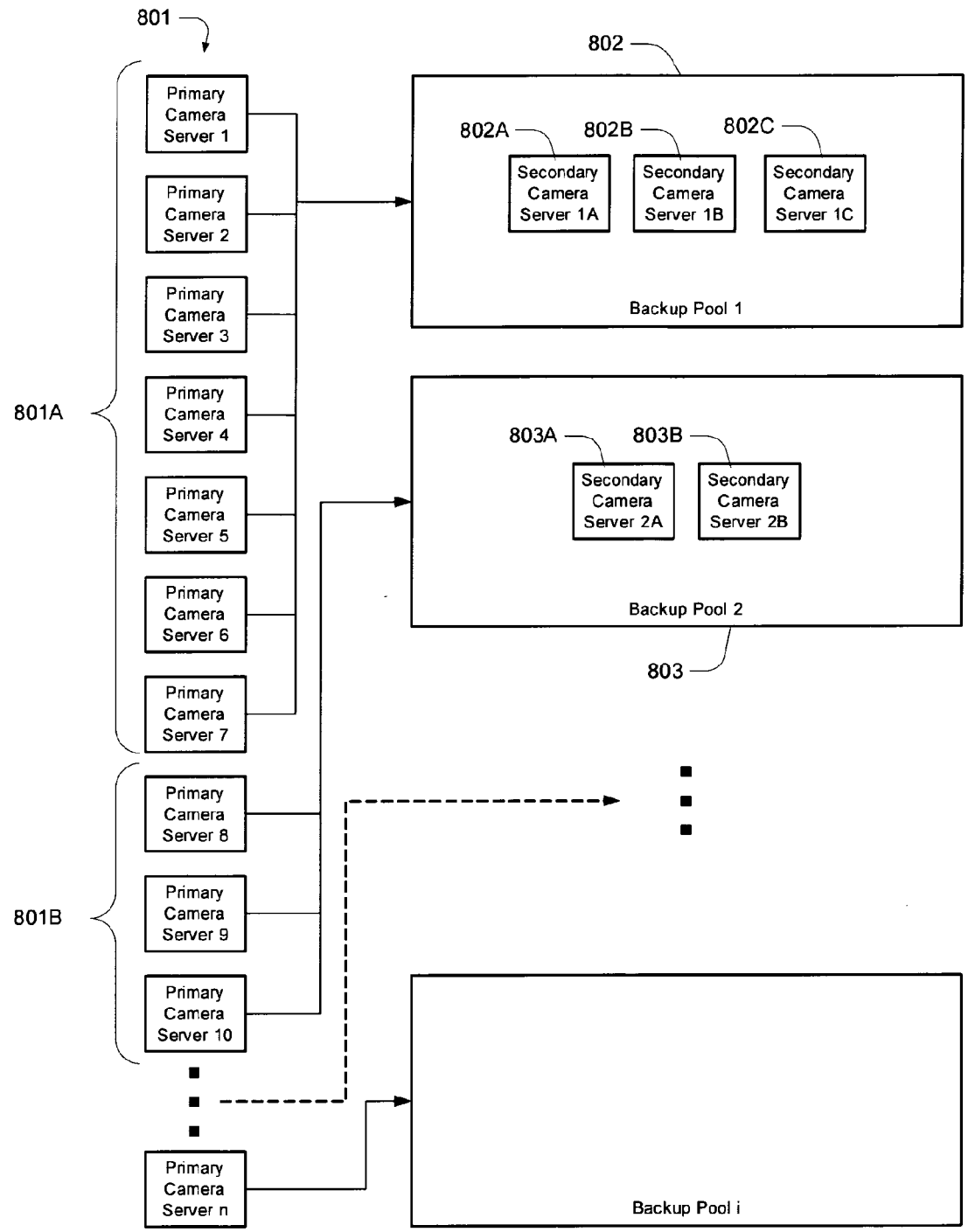
FIG. 8 is a schematic representation of a system for managing live video data according to one embodiment.

FIG. 8 illustrates an embodiment whereby secondary camera servers are arranged in pools. In this embodiment, there are n camera servers 801. These are assigned to i secondary camera server pools, including pool 802 (made up of secondary camera servers 802A, 802B and 802C) and pool 803 (made up of secondary camera servers 803A and 803B). In particular, group 801A of camera servers 801 is assigned to pool 802, and group 801B of camera servers 801 is assigned to pool 803.

Upon failure of a primary camera server in group 801A, the monitoring module configures one of the secondary servers in pool 802 to take over from the failed camera. Upon a further camera server failure in group 801A, a second of the secondary servers in pool 802 is instructed to take over in light of that failure. In the illustrated example, there is capacity to handle three primary camera server failures in group 801A.

It will be appreciated that the ration between primary camera servers assigned to a given pool and the number of secondary camera servers in that pool can be adjusted to as to provide a suitable level of backup for camera servers based on, for example, the sensitivity of footage they make available.

In some embodiments along the lines of FIG. 8, a single monitoring module executes for each pool. This need not be provided by a secondary camera server in that pool.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of building management system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A video management system including:
a plurality of cameras configured to provide live video data to a network;
a plurality of camera servers connected to the network, each camera server being configurable to make live video data available from an assigned subset of the plurality of cameras in real time to one or more clients;
wherein each camera server is configured to:
maintain data indicative of an assigned one or more cameras, such that the camera server is enabled to operate as a primary camera server for those cameras;
maintain data indicative of one or more other camera servers for which it is assigned as a backup, such that the camera server is enabled to operate as a secondary camera server;
maintain data indicative of another camera server which is assigned as a backup to the camera server;
communicate camera server health change messages on the network in the case that the camera server has a change in health; and
execute a monitoring module configured to access input indicative of health change messages published on the network, and, in the case of a predetermined health change message for a given one of the other camera servers for which it is assigned as a backup:
update its data indicative of an assigned one or more cameras to include the assigned one or more cameras of that other camera server; or
update its data indicative of one or more other camera servers for which it is assigned as a backup to include one or more camera servers for which the given one of the other camera servers is assigned as a backup;
wherein the monitoring module is additionally configured to, in the case of a predetermined health change message for a given other camera server which is assigned as a backup to the camera server, provide an alert signal indicative of a lack of backup;
the system further including a component configured to execute an automatic process such that a most recent camera server connecting to the network is, upon connection to the network, automatically configured in the same manner as a most recent camera server to leave the network, wherein the configuration includes:
determining, for the most recent camera server to leave the network, data indicative of an assigned one or more cameras, data indicative of one or more other camera servers for which it is assigned as a backup, and data indicative of another camera server which is assigned as a backup to the camera server; and
applying the determined data indicative of an assigned one or more cameras, data indicative of one or more other camera servers for which it is assigned as a backup, and data indicative of another camera server which is assigned as a backup to the camera server to the most recent camera server connecting to the network.

2. A system according to claim 1 wherein the monitoring module passively receives the input indicative of camera health change messages published on the network.

3. A system according to claim 1 wherein the monitoring module actively obtains the input indicative of camera health change messages published on the network.

4. A system according to claim 1 wherein the predetermined health change message indicates that the other given camera server is inferred to be failing to make the live video data available to the one or more clients.

5. A system according to claim 1 wherein the health change messages from a particular camera server are indicative of one or more of the following:
a status of the connection between the particular camera server and the network;
an operational status of the particular camera sever; and
an execution status of one or more services configured to run on the particular camera server.

6. A method for operating a camera server, the method including the steps of:
providing a data store configured to maintain data indicative of an assigned one or more cameras, such that the camera server is enabled to operate as a primary camera server for those cameras;

providing a data store configured to maintain data indicative of one or more other camera servers for which the camera server is assigned as a backup, such that the camera server is enabled to operate as a secondary camera server;

providing a data store configured to maintain data indicative of another camera server which is assigned as a backup to the camera server;

communicating camera server health change messages on a network in the case that the camera server has a change in health; and executing a monitoring module configured to assess input indicative of health change messages published on the network, and, in the case of a predetermined health change message for a given one of the other camera servers for which it is assigned as a backup:
  update its data indicative of an assigned one or more cameras to include the assigned one or more cameras of that other camera server; or
  update its data indicative of one or more other camera servers for which it is assigned as a backup to include one or more camera servers for which the given one of the other camera servers is assigned as a backup;

wherein the monitoring module is additionally configured to, in the case of a predetermined health change message for a given other camera server which is assigned as a backup to the camera server, provide an alert signal indicative of a lack of backup;

wherein the method further includes operating a component configured to execute an automatic process such that a most recent camera server connecting to the network is, upon connection to the network, automatically configured in the same manner as a most recent camera server to leave the network, wherein the configuration includes:
  determining, for the most recent camera server to leave the network, data indicative of an assigned one or more cameras, data indicative of one or more other camera servers for which it is assigned as a backup, and data indicative of another camera server which is assigned as a backup to the camera server; and
  applying the determined data indicative of an assigned one or more cameras, data indicative of one or more other camera servers for which it is assigned as a backup, and data indicative of another camera server which is assigned as a backup to the camera server to the most recent camera server connecting to the network.

7. A non-transitory computer-readable carrier medium carrying a set of instructions that when executed by one or more processors cause the one or more processors to perform a method of operating a camera server, the method including the steps of:

providing a data store configured to maintain data indicative of an assigned one or more cameras, such that the camera server is enabled to operate as a primary camera server for those cameras;

providing a data store configured to maintain data indicative of one or more other camera servers for which the camera server is assigned as a backup, such that the camera server is enabled to operate as a secondary camera server;

providing a data store configured to maintain data indicative of another camera server which is assigned as a backup to the camera server;

communicating camera server health change messages on a network in the case that the camera server has a change in health; and executing a monitoring module configured to assess input indicative of health change messages published on the network, and, in the case of a predetermined health change message for a given one of the other camera servers for which it is assigned as a backup:
  update its data indicative of an assigned one or more cameras to include the assigned one or more cameras of that other camera server; or
  update its data indicative of one or more other camera servers for which it is assigned as a backup to include one or more camera servers for which the given one of the other camera servers is assigned as a backup;

wherein the monitoring module is additionally configured to, in the case of a predetermined health change message for a given other camera server which is assigned as a backup to the camera server, provide an alert signal indicative of a lack of backups wherein the method further includes operating a component configured to execute an automatic process such that a most recent camera server connecting to the network is, upon connection to the network, automatically configured in the same manner as a most recent camera server to leave the network, wherein the configuration includes:
  determining, for the most recent camera server to leave the network, data indicative of an assigned one or more cameras, data indicative of one or more other camera servers for which it is assigned as a backup, and data indicative of another camera server which is assigned as a backup to the camera server; and
  applying the determined data indicative of an assigned one or more cameras, data indicative of one or more other camera servers for which it is assigned as a backup, and data indicative of another camera server which is assigned as a backup to the camera server to the most recent camera server connecting to the network.

* * * * *